(12) United States Patent
Tsukada et al.

(10) Patent No.: US 7,970,522 B2
(45) Date of Patent: Jun. 28, 2011

(54) GEAR SHIFTING CONTROL SYSTEM FOR WORK MACHINE

(75) Inventors: Hidenobu Tsukada, Tsuchiura (JP); Kazunori Nakamura, Tsuchiura (JP); Youichi Kowatari, Kasumigaura (JP); Masaki Yoshikawa, Kasama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 269 days.

(21) Appl. No.: 11/909,780

(22) PCT Filed: Nov. 9, 2006

(86) PCT No.: PCT/JP2006/322354
§ 371 (c)(1),
(2), (4) Date: Sep. 26, 2007

(87) PCT Pub. No.: WO2007/066469
PCT Pub. Date: Jun. 14, 2007

(65) Prior Publication Data
US 2009/0055062 A1 Feb. 26, 2009

(30) Foreign Application Priority Data
Dec. 6, 2005 (JP) ................................. 2005-352744

(51) Int. Cl.
*G06F 7/00* (2006.01)
(52) U.S. Cl. ................................. 701/56; 701/58; 74/335
(58) Field of Classification Search .................... 701/56, 701/58; 477/102; 706/90, 900; 74/335
See application file for complete search history.

(56) References Cited

U.S. PATENT DOCUMENTS

| 4,977,797 | A | 12/1990 | Aoki et al. | |
| 5,459,658 | A | 10/1995 | Morey et al. | |
| 6,131,062 | A * | 10/2000 | Nielsen | 701/50 |
| 6,292,729 | B2 * | 9/2001 | Falck et al. | 701/50 |
| 6,328,674 | B1 | 12/2001 | Matsue et al. | |
| 6,681,551 | B1 * | 1/2004 | Sheidler et al. | 56/10.2 G |

FOREIGN PATENT DOCUMENTS

| JP | 59-097351 | 6/1984 |
| JP | 1-188760 | 7/1989 |
| JP | 06-050418 | 2/1994 |
| JP | 7-208594 | 8/1995 |
| JP | 09-303538 | 11/1997 |
| JP | 10-061758 | 3/1998 |
| JP | 10-175461 | 6/1998 |

* cited by examiner

*Primary Examiner* — Mark Hellner
(74) *Attorney, Agent, or Firm* — Mattingly & Malur, PC

(57) ABSTRACT

A work machine gear shifting control system provides gear shifting conditions for an automatic gear shifting mode in accordance with work site conditions. An area 62 of a display device 49 displays a permissible velocity setting range and setup operation guidance, and another area 64 shows guidance to indicate whether the setting is acceptable or unacceptable. When the traveling velocity falls within the permissible velocity setting range, the displayed guidance changes to indicate that the setting is acceptable. When, in this instance, an operator presses a setup switch 23 with desired timing, a transmission gear shifting control section 45 acquires the prevailing vehicle velocity and velocity ratio (or vehicle velocity), and stores adjustment values in an adjustment value storage section 43 so that the vehicle velocity and velocity ratio become the gear shifting control threshold values for normal gear shifting control (steps S535 to S545).

7 Claims, 19 Drawing Sheets

CONTINUATION OF FIG. 10
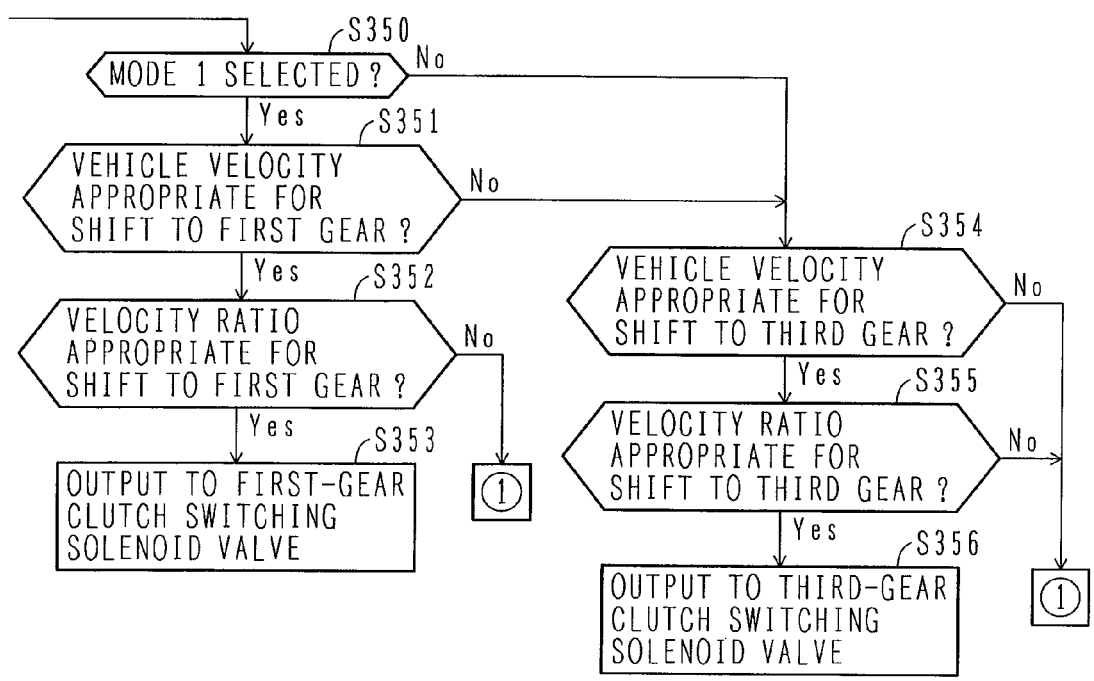

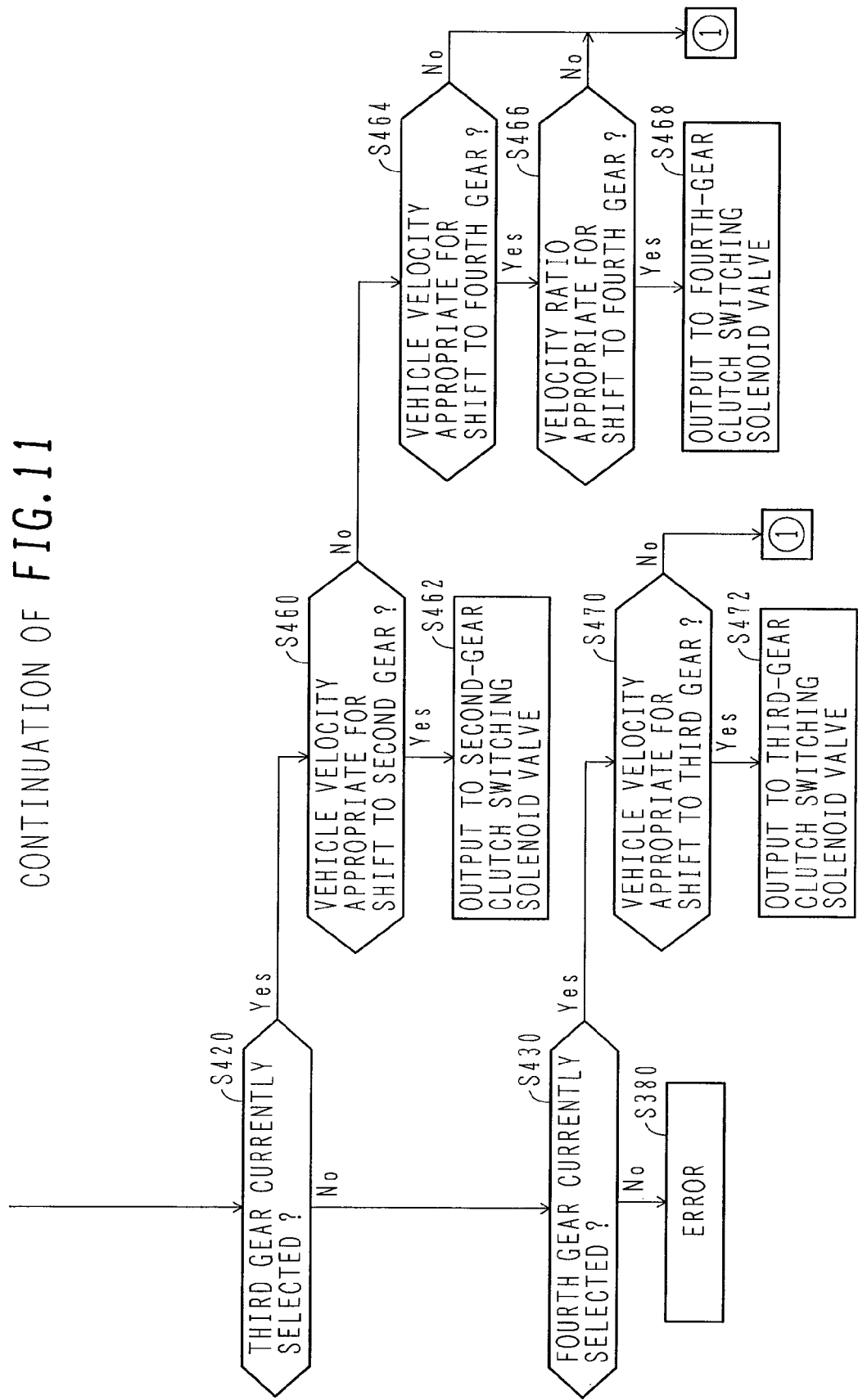

NORMAL STATE

SETUP STATE

GEAR SHIFTING POINT SETUP

GEAR SHIFTING POINT SETUP COMPLETION

SETUP ITEM CHANGE 1

SETUP ITEM CHANGE 2

SETUP ITEM CHANGE 3

SETUP ITEM CHANGE 4

SETUP ITEM CHANGE 5

GEAR SHIFTING CONTROL SYSTEM FOR WORK MACHINE

TECHNICAL FIELD

The present invention relates to a gear shifting control system for a wheel loader or other work machine having a transmission, and more particularly to a gear shifting control system for a work machine having automatic gear shifting means that changes a gear ratio by shifting the gears of a transmission when a vehicle velocity exceeds a threshold value.

BACKGROUND ART

A work machine such as a wheel loader generally travels by transmitting the power of an engine to wheels through a torque converter and a transmission. The transmission has a plurality of gears and changes the gear ratio by shifting the gears. Transmission gear shifting is achieved by a gear shifting control system. There are two gear shifting modes: a manual gear shifting mode and an automatic gear shifting mode. The automatic gear shifting mode generally includes a plurality of modes that differ in gear shifting conditions such as a vehicle velocity at a gear shifting point.

A typical work machine having a gear shifting control system described above is disclosed, for instance, in Japanese Patent JP-A-7-208594. The known technology disclosed in Japanese Patent JP-A-7-208594 provides increased work efficiency by offering four modes (free-traveling mode and work modes 1 to 3) and allowing an operator to select an appropriate mode with a switch in accordance with the road surface condition and soil property of a work site.

Patent Document 1: Japanese Patent JP-A-7-208594

DISCLOSURE OF INVENTION

Problems to be Solved by the Invention

However, there are the following problems with the above conventional technology.

A gear shifting control system for a wheel loader or other work machine offers a manual gear shifting mode and an automatic gear shifting mode. The automatic gear shifting mode includes a plurality of modes. A vehicle velocity and other gear shifting conditions for the plurality of modes are generally set by the manufacturer prior to product shipment or delivery so that the gear shifting condition settings cannot be readily adjusted by the user.

In marked contrast to automobiles, wheel loaders and other work machines often perform repetitive and monotonous work at the same site. Further, work site conditions can vary greatly from one work site to the next.

When, for instance, a wheel loader is used in a quarry, the wheel loader performs three different types of work. More specifically, the wheel loader carries gravel, which is obtained from the quarry, from the quarry to a dump truck standby site, loads the gravel onto a dump truck, and returns to the quarry after the gravel is loaded onto the dump truck. Loading the gravel onto the dump truck is performed on a flat ground surface. However, carrying gravel from the quarry to the dump truck standby site and returning to the quarry after the gravel is loaded onto the dump truck are performed while moving upward or downward along a long slope. The gradient (tilt) of the slope varies from one work site to another.

When the gear shifting control system has a plurality of automatic gear shifting modes, it is possible to select a desired gear shifting mode with a switch and exercise gear shifting control to a certain extent under gear shifting conditions (with gear shifting timing) appropriate for the work site. However, all slopes whose gradient varies from one work site to another cannot be handled merely by using a manufacturer-defined threshold value setting for a gear shifting mode. If a slope that cannot be properly handled by such a threshold value setting is encountered, work efficiency significantly decreases because gears are shifted at locations which are unexpected by an operator.

Even if the threshold value setting can be adjusted by the user by entering a numerical value, the user cannot immediately judge whether the entered numerical value is appropriate for a work site slope. The appropriateness of the entered numerical value cannot be confirmed until the wheel loader actually moves along the slope with the entered numerical value. Consequently, the appropriateness of the entered numerical value is confirmed on a trial-and-error basis. Thus, it takes a considerable amount of time to confirm the appropriateness of the entered numerical value.

An object of the present invention is to provide a work machine gear shifting control system that provides enhanced work efficiency by making it easy to set up desired gear shifting conditions for an automatic gear shifting mode in accordance with work site conditions.

Means for Solving the Problems (1) In accomplishing the above object, according to one aspect of the present invention, there is provided a gear shifting control system for a work machine which travels by transmitting power from an engine to the wheels through a torque converter and a transmission, the gear shifting control system comprising: automatic gear shifting control means having an automatic gear shifting mode in which the gear ratio in the transmission is changed based on a preset threshold value of gear shifting control thereby to perform gear shifting of the transmission; and learning correction means for learning desired gear shifting conditions in response to an operator intervention while the work machine travels, and correcting the gear shifting control threshold value so as to obtain the desired gear shifting conditions.

When the learning correction means is included as described above and used to correct the gear shifting control threshold value for the automatic gear shifting mode in such a manner as to obtain the desired gear shifting conditions learned during a work machine travel, the gear shifting control threshold value is learned and set up so as to obtain gear shifting conditions for a desired point in time at which the work machine is actually operated by an operator. This makes it possible to set up desired gear shifting conditions in accordance with work site conditions, obtain desired gear shifting timing by performing work while shifting gears under the gear shifting conditions, and provide enhanced work efficiency. Further, since desired gear shifting conditions are learned in response to an operator intervening during traveling operation of the work machine, setup work can be easily carried out without having to repeat a trial-and-error process.

(2) According to another aspect of the present invention, there is provided the gear shifting control system as described in (1) above, wherein the learning correction means includes first operating means, which is operated by an operator, and gear shifting condition acquisition means, which acquires gear shifting conditions prevailing when the first operating means is operated and stores a value for acquiring the gear shifting conditions; and wherein the automatic gear shifting control means includes first threshold value setup means, which sets the gear shifting control threshold value by using the value stored in the gear shifting condition acquisition means.

(3) According to another aspect of the present invention, there is provided the gear shifting control system as described in (2) above, further comprising: second operating means, which is operated by the operator and used to choose between a normal mode and a learning mode; wherein the learning correction means further includes means for causing the gear shifting condition acquisition means to function when the learning mode is selected; and wherein the automatic gear shifting control means includes second threshold value setup means for setting a gear shifting control threshold value for the learning mode, and threshold value switching means for causing the first threshold value setup means to set a gear shifting control threshold value when the normal mode is selected and causing the second threshold value setup means to set a gear shifting control threshold value when the learning mode is selected.

(4) According to another aspect of the present invention, there is provided the gear shifting control system as described in (2) above, wherein the gear shifting condition acquisition means stores the acquired value for acquiring the gear shifting conditions as an adjustment value for the gear shifting control threshold value; and wherein the threshold value setup means sets the gear shifting control threshold value by using the adjustment value for the threshold value and a preset initial value for the threshold value.

(5) According to another aspect of the present invention, there is provided the gear shifting control system as described in (4) above, wherein the gear shifting condition acquisition means calculates the difference between an acquired gear shifting condition and the initial value for the gear shifting control threshold value, and stores the difference as the adjustment value; and wherein the first threshold value setup means adds the difference to the initial value for the gear shifting control threshold value, and sets the resulting value as the gear shifting control threshold value.

(6) According to another aspect of the present invention, there is provided the gear shifting control system as described in (2) above, further comprising: gear shifting condition acquisition permission means for permitting the gear shifting condition acquisition means to acquire gear shifting conditions only when the acquired gear shifting conditions are within a permissible setting range; and first display means for displaying a guidance that indicates whether gear shifting condition acquisition is permitted by the gear shifting condition acquisition permission means.

Consequently, even when the gear shifting control threshold value is to be set through learning and correction, it is possible to set the threshold value within an appropriate range that does not affect gear shifting control, and to exercise reasonable gear shifting control. Further, the operator can set the threshold value with appropriate timing while viewing the guidance displayed on the first display means.

(7) According to another aspect of the present invention, there is provided the gear shifting control system as described in (6) above, further comprising: second display means for displaying a guidance that indicates whether the current gear shifting conditions are within the permissible setting range.

Consequently, the operator who sets the gear shifting control threshold value through learning and correction can set an appropriate threshold value without anxiety while viewing the guidance displayed on the second display means.

(8) According to another aspect of the present invention, there is provided the gear shifting control system as described in (1) above, further comprising: learning/correction reset means for allowing the operator to reset the gear shifting control threshold value to the initial value.

Consequently, the operator can restore an original value (initial value or standard value), which is supplied from the manufacturer, anytime after setting the gear shifting control threshold value through learning and correction.

(9) According to another aspect of the present invention, there is provided the gear shifting control system as described in (1) above, wherein the learning correction means acquires as a gear shifting condition to be learned a vehicle velocity prevailing when the operator performs an operation with intended timing.

(10) According to still another aspect of the present invention, there is provided the gear shifting control system as described in (1) above, wherein the gear shifting condition acquisition means acquires as gear shifting conditions to be learned a vehicle velocity and a velocity ratio that prevail when the operator performs an operation with intended timing.

Advantages of the Invention

The present invention makes it possible to easily set up desired gear shifting conditions for an automatic gear shifting mode in accordance with work site conditions and provide enhanced work efficiency.

DESCRIPTION OF REFERENCE NUMERALS

Figure 1:
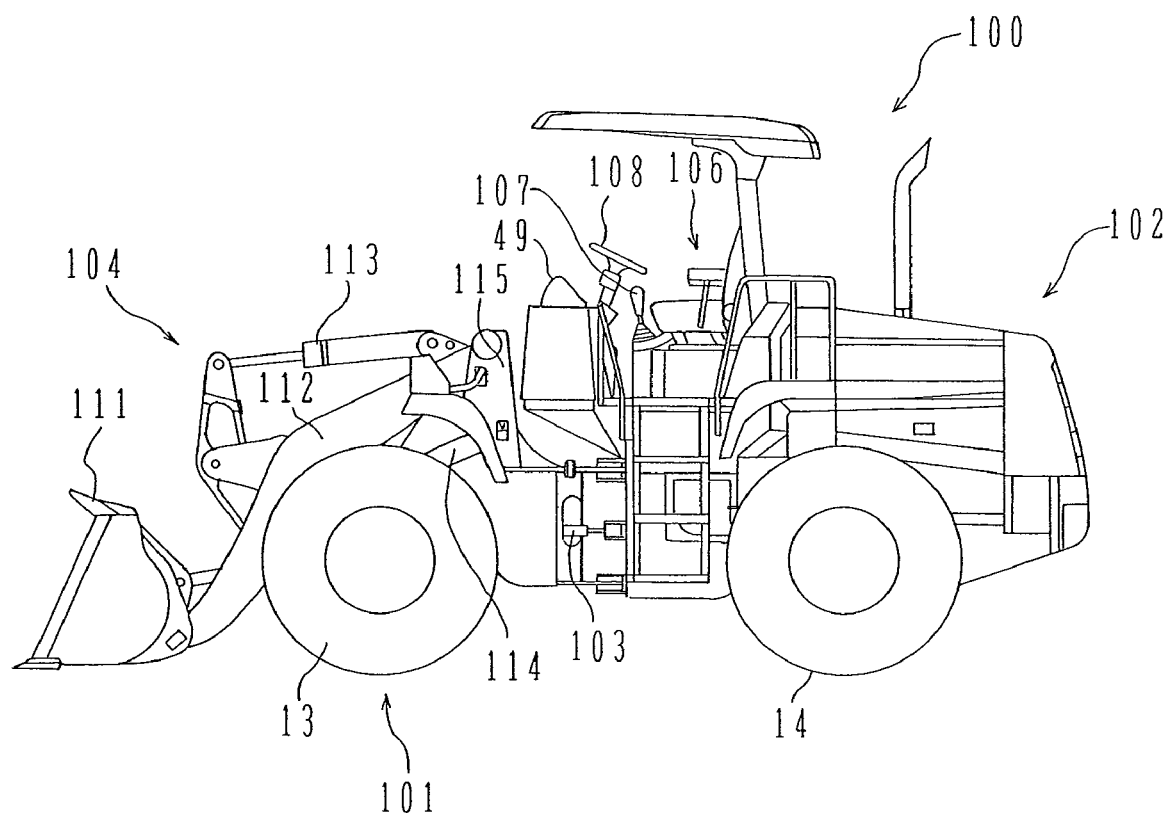
FIG. 1 is an external view illustrating a wheel loader (work machine) to which the present invention is applied.

10: Engine
11: Torque converter
12: Transmission
13: Front wheel
14: Rear wheel
21: Mode switch
22: Setup start switch
23: Setup switch
24: Forward/reverse travel selector switch
25: Gear shifting switch
26: Engine rotation sensor
27: Torque converter output rotation sensor
28: Intermediate shaft rotation sensor
29: Transmission output shaft rotation sensor
30: Controller
31: Mode switch judgment section
32: Setup start switch judgment section
33: Setup switch judgment section
34: Forward/reverse travel switch judgment section
35: Gear shifting switch judgment section
36: Engine rotation computation section
37: Torque converter output rotation computation section
38: Intermediate shaft rotation computation section
39: Transmission output shaft rotation computation section
40: Velocity ratio computation section
41: Vehicle velocity computation section
42: Rotation sensor error judgment section
43: Adjustment value storage section
44: Gear shift timing storage section
45: Transmission gear shifting control section
49: Display device
50: Clutch switching solenoid valve device
51: Forward clutch switching solenoid valve
52: Reverse clutch switching solenoid valve
53: First-gear clutch switching solenoid valve
54: Second-gear clutch switching solenoid valve
55: Third-gear clutch switching solenoid valve
56: Fourth-gear clutch switching solenoid valve
61: Area
62: Area
63: Area
64: Area
100: Wheel loader
101: Front vehicle body
102: Rear vehicle body
103: Steering cylinder
104: Front working device
106: Cab
107: Control lever
108: Steering wheel
111: Bucket
112: Boom
113: Bucket cylinder
114: Boom cylinder
115: Support section

BEST MODE FOR CARRYING OUT THE INVENTION

Embodiments of the present invention will now be described with reference to the accompanying drawings.

FIG. 1 is an external view illustrating a wheel loader (work machine) to which the present invention is applied. As shown in FIG. 1, the wheel loader 100 includes a front vehicle body 101 and a rear vehicle body 102. The front vehicle body 101 and rear vehicle body 102 are coupled together so that a steering cylinder 103 allows the front vehicle body 101 to freely turn and become variously oriented in relation to the rear vehicle body 102. The front vehicle body 101 includes a front working device 104. The rear vehicle body 102 includes a cab 106. The cab 106 is provided with operating control means such as a control lever 107 and a steering wheel 108.

The front working device 104 includes a bucket (operating tool) 111 and a boom 112. The bucket 111 performs a tilting/dumping operation as a bucket cylinder 113 telescopes. The boom 112 vertically moves as a boom cylinder 114 telescopes. The boom 112 and boom cylinder 114 are pin-coupled to a support section 115. The boom 112, boom cylinder 114, and support section 115 constitute a link mechanism.

Figure 2:
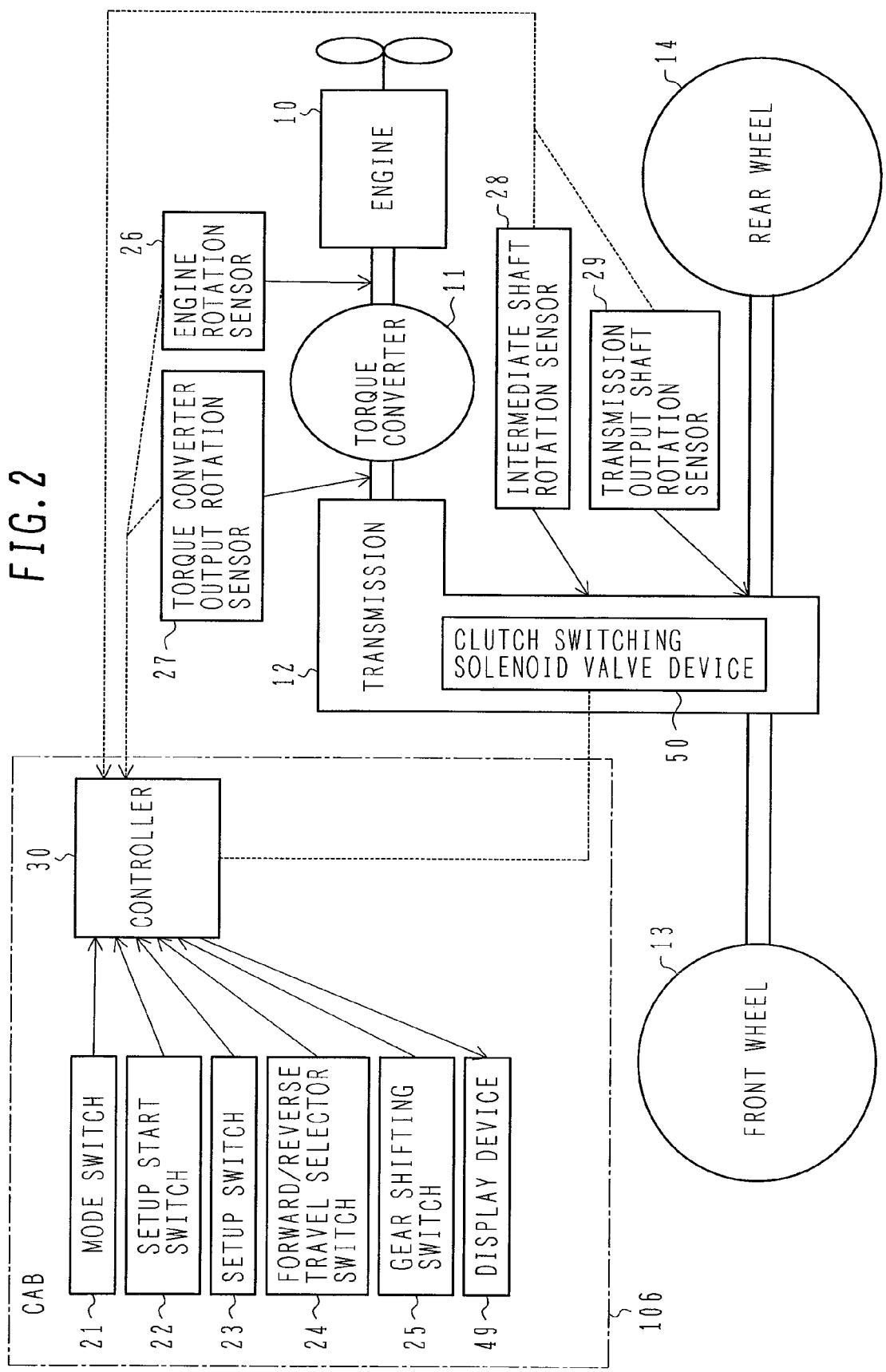
FIG. 2 is a schematic diagram illustrating the overall configuration of a travel system for a wheel loader (work machine) having a gear shifting control system according to an embodiment of the present invention.

FIG. 2 is a schematic diagram illustrating the overall configuration of a travel system for the wheel loader (work machine) 100 having a gear shifting control system according to an embodiment of the present invention.

As shown in FIG. 2, the travel system for the wheel loader 100 includes an engine 10, a torque converter 11, a transmission 12, front wheels 13, and rear wheels 14. The engine 10, torque converter 11, and transmission 12 are mounted in the rear vehicle body 102 of the wheel loader 100. The front wheels 13 and rear wheels 14 are attached to the front vehicle body 101 and rear vehicle body 102, respectively (see FIG. 1). The wheel loader 100 travels as power generated by the engine 10 is transmitted to the front wheels 13 and rear wheels 14 via the torque converter 11 and transmission 12.

The gear shifting control system according to the present embodiment is provided in the travel system for the wheel loader 100 described above. The gear shifting control system includes a mode switch 21, a setup start switch 22, a setup switch 23, a forward/reverse travel selector switch 24, a gear shifting switch 25, an engine rotation sensor 26, a torque converter output rotation sensor 27, an intermediate shaft rotation sensor 28, a transmission output shaft rotation sensor 29, a controller 30 that inputs switch signals and sensor signals from the aforementioned switches and sensors and performs predetermined computations on the input signals, a display device 49 that displays a traveling speed and other information (described later) in accordance with processing results produced by the controller 30, and a clutch switching solenoid valve device 50 that operates in accordance with the processing results produced by the controller 30.

The mode switch 21 includes, for instance, a rotating dial, and has positions for a manual mode and automatic gear shifting modes 1 to 3. One of the manual mode and automatic gear shifting modes 1 to 3 can be selected by placing the mode switch 21 in an appropriate position. The setup start switch 22 and setup switch 23 are momentary action switches, which turn ON only when their switch operating section is pressed.

The display device 49 is mounted in the cab 106 of the wheel loader 100 (see FIG. 1). The clutch switching solenoid valve device 50 has a plurality of solenoid valves, including a forward clutch switching solenoid valve 51, a reverse clutch switching solenoid valve 52, a first-gear clutch switching solenoid valve 53, a second-gear clutch switching solenoid valve 54, a third-gear clutch switching solenoid valve 55, and a fourth-gear clutch switching solenoid valve 56 (FIG. 3).

Figure 3:
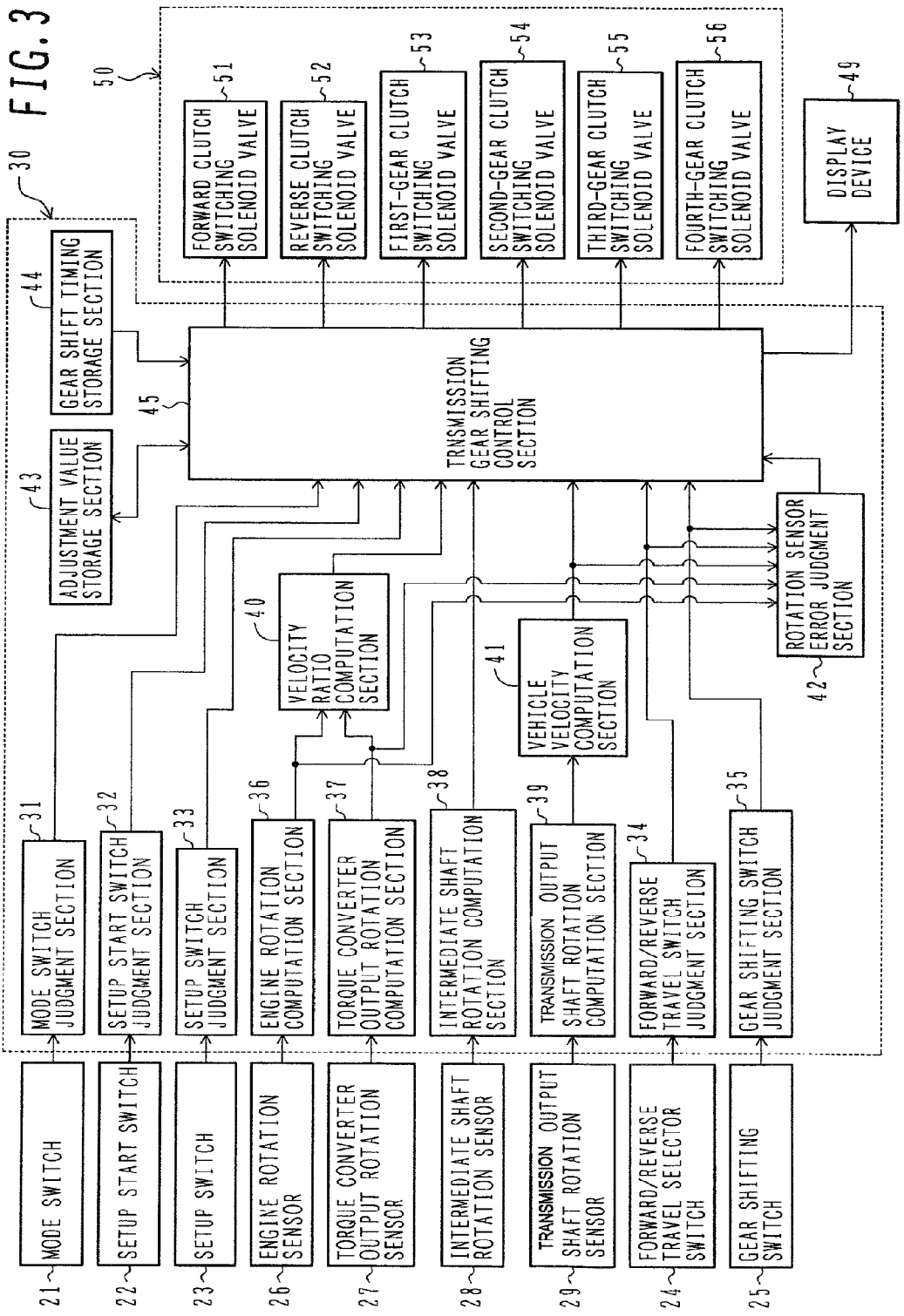
FIG. 3 is a functional block diagram illustrating the details of a process performed by a controller.

FIG. 3 is a functional block diagram illustrating the details of a process performed by the controller 30. The controller 30 includes a mode switch judgment section 31, a setup start switch judgment section 32, a setup switch judgment section 33, a forward/reverse travel switch judgment section 34, a gear shifting switch judgment section 35, an engine rotation computation section 36, a torque converter output rotation computation section 37, an intermediate shaft rotation computation section 38, a transmission output shaft rotation computation section 39, a velocity ratio computation section 40, a vehicle velocity computation section 41, a rotation sensor error judgment section 42, an adjustment value storage section 43, a gear shift timing storage section 44, and a transmission gear shifting control section 45.

Switch signals from the mode switch 21, setup start switch 22, and setup switch 23 are input into the mode switch judgment section 31, setup start switch judgment section 32, and setup switch judgment section 33, respectively. Switch signals from the forward/reverse travel selector switch 24 and gear shifting switch 25 are input into the forward/reverse travel switch judgment section 34 and gear shifting switch judgment section 35, respectively. A pulse signal from the intermediate shaft rotation sensor 28 is input into the intermediate shaft rotation computation section 38. The mode switch signal, setup start switch signal, and setup switch signal judged in the judgment sections 31-33, the forward/reverse travel signal and gear shifting signal judged in the judgment sections 34, 35, and the intermediate shaft rotation speed (number of rotations) computed by the intermediate shaft rotation computation section 38 are input into the transmission gear shifting control section 45.

Pulse signals from the engine rotation sensor 26 and torque converter output rotation sensor 27 are input into the engine rotation computation section 36 and torque converter output rotation computation section 37. These computation sections 36, 37 compute the respective rotation speeds (number of rotations) and enter them into the velocity ratio computation section 40. The velocity ratio computation section 40 computes a velocity ratio from the input rotation speeds and enters the computed velocity ratio into the transmission gear shifting control section 45. The input velocity ratio causes the transmission gear shifting control section 45 to determine a traveling load.

A pulse signal from the transmission output shaft rotation sensor 29 is input into the transmission output shaft rotation computation section 39. This computation section 39 computes the rotation speed (number of rotations) of a transmission output shaft and enters it into the vehicle velocity computation section 41. The vehicle velocity computation section 41 computes a vehicle velocity from the input rotation speed and enters the computed vehicle velocity into the transmission gear shifting control section 45.

Various pieces of information from the forward/reverse travel switch judgment section 34, gear shifting switch judgment section 35, engine rotation computation section 36, torque converter output rotation computation section 37, intermediate shaft rotation computation section 38, and vehicle velocity computation section 41 are input into the rotation sensor error judgment section 42. The rotation sensor error judgment section 42 formulates error judgments about the rotation sensors 26-29 in accordance with the input information, and enters the judgment results into the transmission gear shifting control section 45.

The gear shift timing storage section 44 stores an initial threshold value (standard value) for normal gear shifting control over each gear shifting point in relation to each of gear shifting modes 1 to 3. The adjustment value storage section 43 stores an adjustment value for the threshold value. The gear shift timing storage section 44 also stores a threshold value for the learning mode gear shifting control over each gear shifting point in relation to each of gear shifting modes 1 to 3.

When the manual mode is selected with the mode switch 21, the transmission gear shifting control section 45 exercises forward/reverse travel control and gear shifting control by outputting instruction signals to the solenoid valves 51-56 that relate to the forward/reverse travel signal and gear shifting signal from the forward/reverse travel selector switch 24 and gear shifting switch 25.

When automatic gear shifting mode 1, 2, or 3 is selected with the mode switch 21, the transmission gear shifting control section 45 performs the following normal gear shifting control process.

<Normal Gear Shifting Control Process>

When automatic gear shifting mode 1, 2, or 3 is selected with the mode switch 21, the transmission gear shifting control section 45 accesses the gear shift timing storage section 44 and adjustment value storage section 43, reads the initial value and adjustment value for a normal gear shifting control threshold value that relate to the selected gear shifting mode, and sets the normal gear shifting control threshold value (sum of the initial value and adjustment value). Next, the transmission gear shifting control section 45 performs a predetermined computation process on the threshold value, the vehicle velocity information from the vehicle velocity computation section 41, the velocity ratio information from the velocity ratio computation section 40, and the forward/reverse travel signal and gear shifting signal from the forward/reverse travel selector switch 24 and gear shifting switch 25, outputs instruction signals to the associated solenoid valves 51-56 in accordance with the processing results, and exercises forward/reverse travel control and gear shifting control.

When automatic gear shifting mode 1, 2, or 3 is selected with the mode switch 21 and the setup start switch 22 is pressed to select a learning mode (described later), the transmission gear shifting control section 45 performs the following learning mode gear shifting control process and learning mode threshold value correction process.

<Learning Mode Gear Shifting Control Process>

When automatic gear shifting mode 1, 2, or 3 is selected with the mode switch 21 and the setup start switch 22 is pressed to enter the learning mode (described later), the transmission gear shifting control section 45 accesses the gear shift timing storage section 44, reads a learning mode gear shifting control threshold value related to the selected gear shifting mode, and sets the learning mode gear shifting control threshold value. Next, the transmission gear shifting control section 45 performs a predetermined computation process on the threshold value, the vehicle velocity information from the vehicle velocity computation section 41, and the forward/reverse travel signal and gear shifting signal from the forward/reverse travel selector switch 24 and gear shifting switch 25, outputs instruction signals to the associated solenoid valves 51-56 in accordance with the processing results, and exercises forward/reverse travel control and gear shifting control.

<Learning Mode Threshold Value Correction Process>

When automatic gear shifting mode 1, 2, or 3 is selected with the mode switch 21 and the setup start switch 22 is pressed to enter the learning mode (described later), the transmission gear shifting control section 45 acquires the vehicle velocity prevailing when the setup switch 23 is pressed and the velocity ratio (or vehicle velocity), computes a value for using the vehicle velocity and velocity ratio as gear shifting control threshold values for normal gear shifting control, and stores the computed value in the adjustment value storage section 43 as an adjustment value for a normal gear shifting control threshold value.

The gear shifting control processes (normal gear shifting control process and learning mode gear shifting control process) and learning mode threshold value correction process will now be described in detail with reference to FIGS. 4 to 21.

Figure 4:
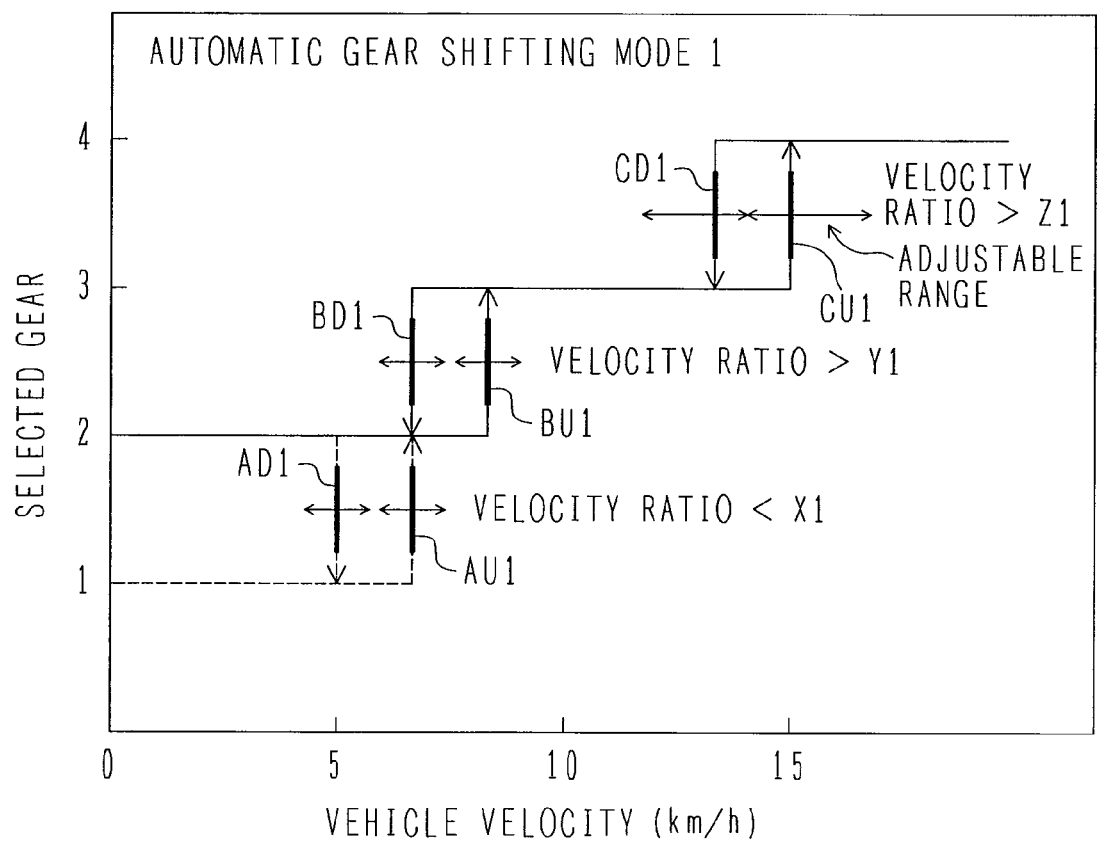
FIG. 4 is a conceptual diagram illustrating a gear shifting control function that is exercised in an automatic gear shifting mode. This figure depicts a case where automatic gear shifting mode 1 is used.
Figure 5:
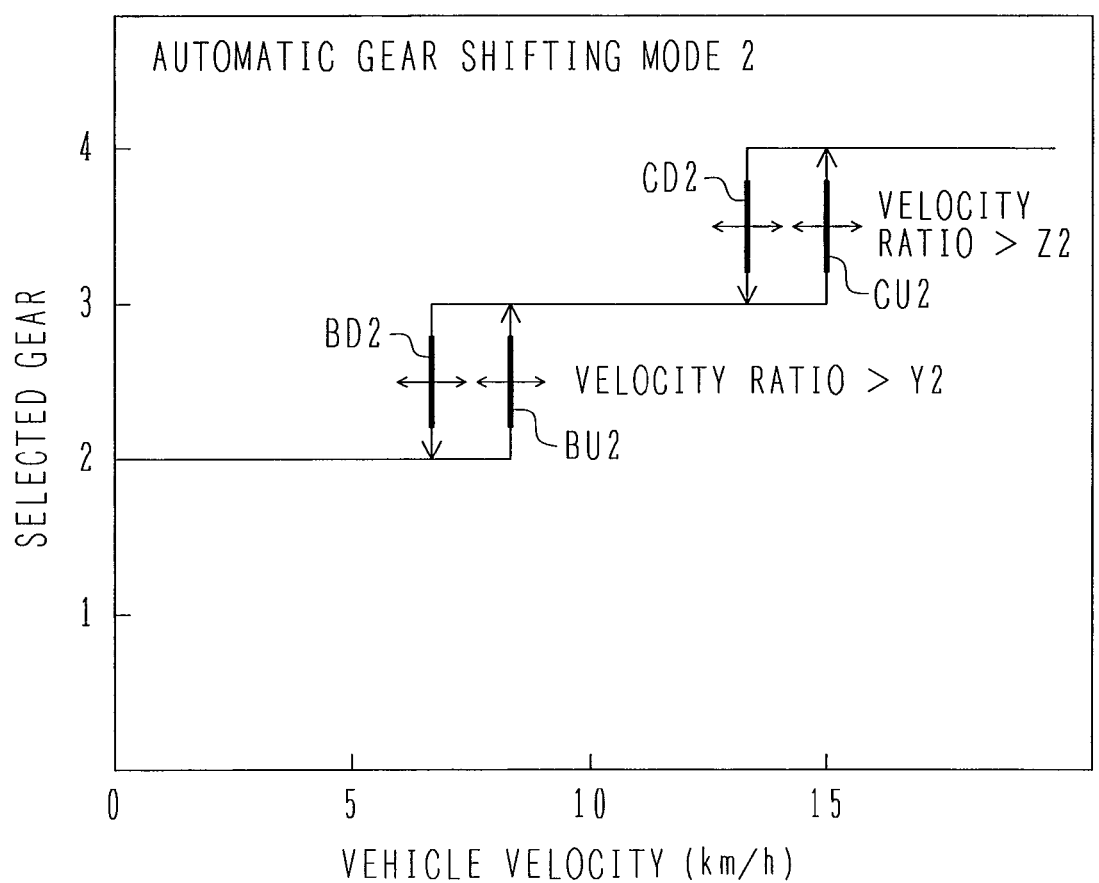
FIG. 5 is a conceptual diagram illustrating the gear shifting control function that is exercised in an automatic gear shifting mode. This figure depicts a case where automatic gear shifting mode 2 is used.
Figure 6:
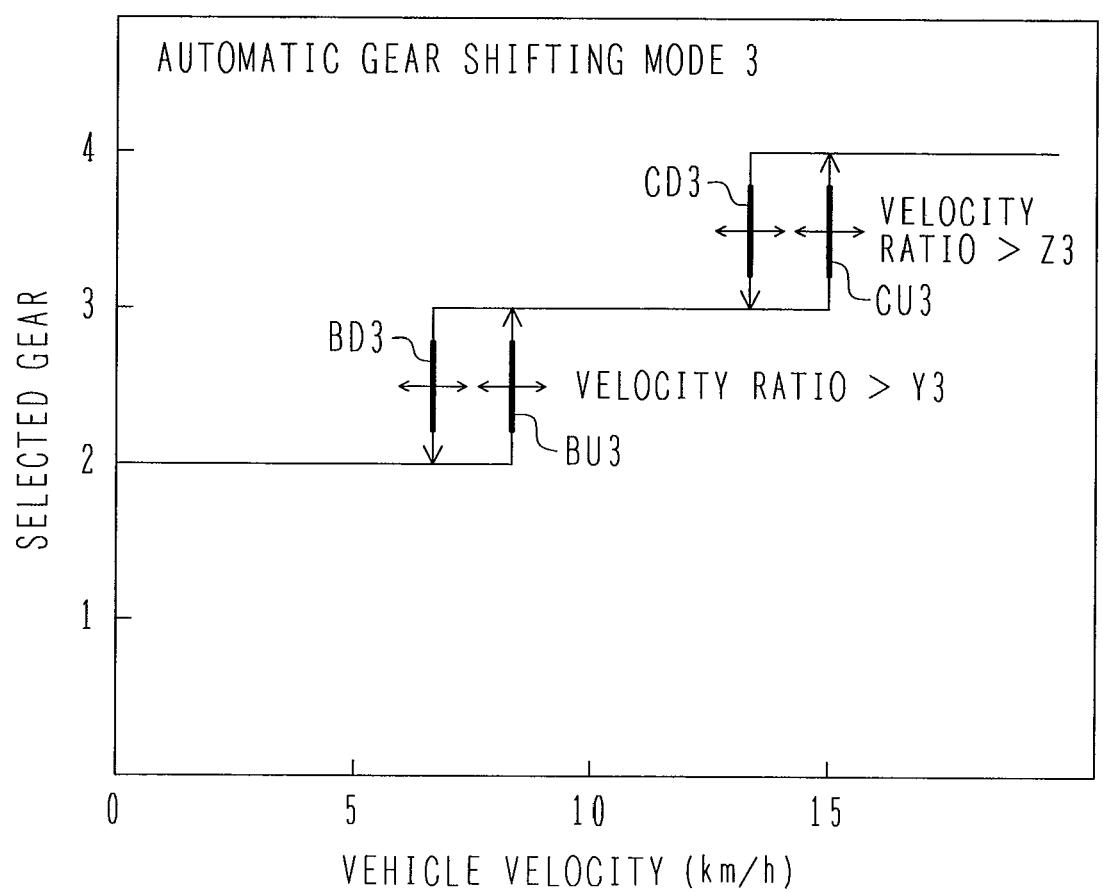
FIG. 6 is a conceptual diagram illustrating the gear shifting control function that is exercised in an automatic gear shifting mode. This figure depicts a case where automatic gear shifting mode 3 is used.

FIGS. 4 to 6 are conceptual diagrams illustrating the normal gear shifting control process. FIG. 4 depicts a case where automatic gear shifting mode 1 is used. FIG. 5 depicts a case where automatic gear shifting mode 2 is used. FIG. 6 depicts a case where automatic gear shifting mode 3 is used. In FIGS. 4 to 6, the horizontal axis indicates the vehicle velocity whereas the vertical axis indicates the selected gear.

<FIG. 4: Automatic Gear Shifting Mode 1>

The following gear shifting conditions are set.

1. At the time of acceleration
   The second gear is selected at startup.
   If the vehicle velocity V>BU1 and the velocity ratio α>Y1 after startup, the vehicle shifts from second gear to third gear.
   If the vehicle velocity>CU1 and the velocity ratio α>Z1, the vehicle shifts from third gear to fourth gear.
   If the vehicle shifts into first gear after the following deceleration, the vehicle shifts from first gear to second gear when the vehicle velocity V<AU1.
   The values AU1, BU1, and CU1 are vehicle velocity threshold values (gear shifting vehicle velocities) for normal gear shifting control. The values Y1 and Z1 are velocity ratio threshold values (gear shifting velocity ratios) for normal gear shifting control.
2. At the time of deceleration
   If the vehicle velocity V≦CD1, the vehicle shifts from fourth gear to third gear.
   If the vehicle velocity V≦BD1, the vehicle shifts from third gear to second gear.
   If the vehicle velocity V≦AD1 and the velocity ratio α<X1, the vehicle shifts from second gear to first gear.
   The values AD1, BD1, and CD1 are vehicle velocity threshold values for normal gear shifting control. The value X1 is a velocity ratio threshold value for normal gear shifting control.

<FIG. 5: Automatic Gear Shifting Mode 2>

The following gear shifting conditions are set.

1. At the time of acceleration
   The second gear is selected at startup.
   If the vehicle velocity V>BU2 and the velocity ratio α>Y2 after startup, the vehicle shifts from second gear to third gear.
   If the vehicle velocity>CU2 and the velocity ratio α>Z2, the vehicle shifts from third gear to fourth gear.
   The values BU2 and CU2 are vehicle velocity threshold values for normal gear shifting control. The values Y2 and Z2 are velocity ratio threshold values for normal gear shifting control.
2. At the time of deceleration
   If the vehicle velocity V≦CD2, the vehicle shifts from fourth gear to third gear.
   If the vehicle velocity V≦BD2, the vehicle shifts from third gear to second gear.
   The values BD2 and CD2 are vehicle velocity threshold values for gear shifting control.

<FIG. 6: Automatic Gear Shifting Mode 3>

The following gear shifting conditions are set.

1. At the time of acceleration
   The second gear is selected at startup.
   If the vehicle velocity V>BU3 and the velocity ratio α>Y3, the vehicle shifts from second gear to third gear.
   If the vehicle velocity>CU3 and the velocity ratio α>Z3, the vehicle shifts from third gear to fourth gear.
   The values BU3 and CU3 are vehicle velocity threshold values for gear shifting control. The values Y3 and Z3 are velocity ratio threshold values for gear shifting control.
2. At the time of deceleration
   If the vehicle velocity V≦CD3, the vehicle shifts from fourth gear to third gear.
   If the vehicle velocity V≦BD3, the vehicle shifts from third gear to second gear.
   The values BD3 and CD3 are vehicle velocity threshold values for gear shifting control.

The gear shifting control processes (normal gear shifting control process and learning mode gear shifting control process) will now be described in detail with reference to flowcharts in FIGS. 7 to 11.

Figure 7:
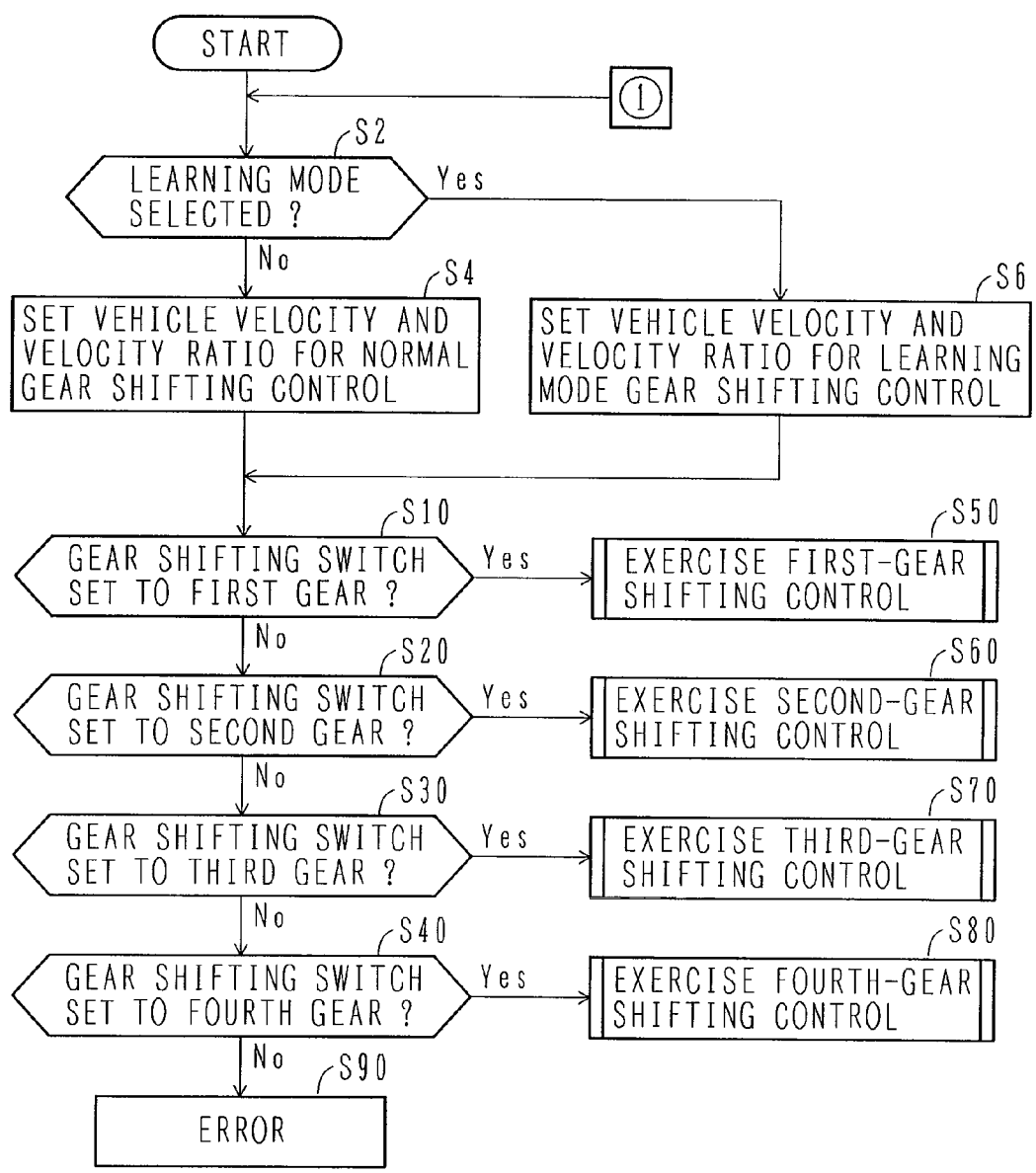
FIG. 7 is a flowchart giving an overview of the gear shifting control function that is exercised in an automatic gear shifting mode.

FIG. 7 is a flowchart giving an overview of the gear shifting control processes.

First of all, the transmission gear shifting control section 45 judges whether the learning mode is selected in the gear shifting control mode (step S2). Whether the learning mode is selected is determined by judging whether the setup start switch 22 is pressed once (described later). If the learning mode is not selected in the gear shifting mode, step S4 is performed to set vehicle velocity and velocity ratio threshold values for normal gear shifting control. If the learning mode is selected in the gear shifting mode, step S6 is performed to set a vehicle velocity for learning mode gear shifting control.

The vehicle velocity and velocity ratio threshold values for normal gear shifting control are set as described below. First of all, the initial values and adjustment values for the vehicle velocity and velocity ratio threshold values are read from the gear shift timing storage section 44 and adjustment value storage section 43 in accordance with the automatic gear shifting mode selected with the mode switch 21. Next, the threshold values for normal gear shifting control are calculated as indicated below:

Threshold value=initial value+adjustment value

In mode 1, the values AU1, BU1, CU1, AD1, BD1, CD1, X1, Y1, and Z1, which are shown in FIG. 4, are calculated as the threshold values. In mode 2, the values BU2, CU2, BD2, CD2, Y2, and Z2, which are shown in FIG. 5, are calculated as the threshold values. In mode 3, the values BU3, CU3, BD3, CD3, Y3, and Z3, Which are shown in FIG. 6, are calculated as the threshold values.

The settings supplied from the manufacturer are such that the adjustment values for the threshold values are 0 and that the manufacturer's recommended values (standard values) are set as the initial values for the threshold values.

Vehicle velocity threshold value setup for learning mode gear shifting control is performed by reading the vehicle velocity threshold value for learning mode gear shifting control from the gear shift timing storage section 44 in accordance with the automatic gear shifting mode selected with the mode switch 21. In the learning mode, a permissible threshold value setting range for the learning mode is predetermined for each of the gear shifting points for gear shifting modes 1 to 3. In accordance with the automatic gear shifting mode selected with the mode switch 21, the gear shift timing storage section 44 stores an upper-limit value within the permissible setting range for each gear shifting point as a threshold value for upward gear shifting and a lower-limit value within the permissible setting range for each gear shifting point as a threshold value for downward gear shifting. In FIGS. 4 to 6, the rightward and leftward arrows attached to the gear shifting points for various gears indicate a permissible vehicle velocity threshold value setting range for learning mode gear shifting control. As a threshold value for the learning mode, the velocity ratio may also be set in addition to the vehicle velocity.

Next, the transmission gear shifting control section 45 judges whether the gear shifting switch 25 indicates the first gear, second gear, third gear, or fourth gear (steps S10 to S40). The transmission gear shifting control section 45 performs a first-gear shifting control process (step S10->step S50) when the first gear is indicated, a second-gear shifting control process (step S20->step S60) when the second gear is indicated, a third-gear shifting control process (step S30->step S70) when the third gear is indicated, a fourth-gear shifting control process (step S40->step S80) when the fourth gear is indicated, and an error process (step S40->step S90) when no gear is indicated. The transmission gear shifting control section 45 forcibly performs, for instance, the second-gear shifting control process as the error process.

Figure 8:
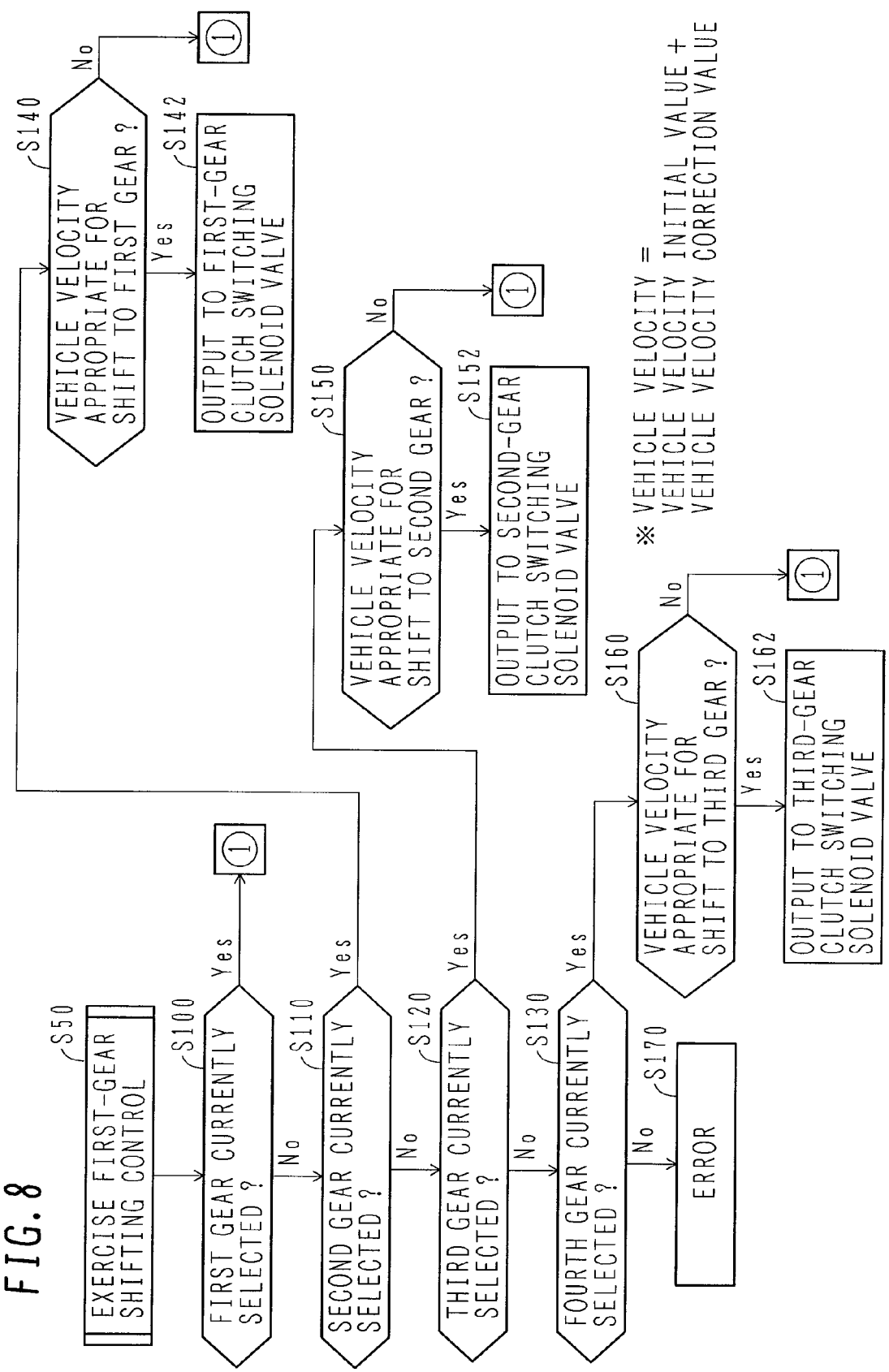
FIG. 8 is a flowchart illustrating the details of a first-gear shifting control process that is shown in FIG. 7.

FIG. 8 is a flowchart illustrating the details of the first-gear shifting control process shown in FIG. 7. In the first-gear shifting control process, steps S100 to S130 are performed to judge whether the first gear, second gear, third gear, or fourth gear is currently selected. If the fourth gear is currently selected, step S160 is performed to judge whether the current vehicle velocity is appropriate for a shift to third gear (smaller than the vehicle velocity threshold value for a fourth-to-third gear shifting point). The currently selected gear can be determined by locating the clutch switching solenoid valve (53, 54, 55, or 56) to which an instruction signal is currently output from the transmission gear shifting control section 45. If the query in step S160 is answered "Yes," step S162 is performed to output an instruction signal to the third-gear clutch switching solenoid valve 55 for the purpose of changing the transmission 12 to the third gear. If, on the other hand, the query is answered "No," processing returns to step S10, which is shown in FIG. 7, without doing anything.

If the third gear is currently selected, step S150 is performed, depending on the mode selected with the mode switch 21, to judge whether the current vehicle velocity is appropriate for a shift to second gear (smaller than the vehicle velocity threshold value for a third-to-second gear shifting point). If the query in step S150 is answered "Yes," step S152 is performed to output an instruction signal to the second-gear clutch switching solenoid valve 54 for the purpose of changing the transmission 12 to the second gear. If, on the other hand, the query is answered "No," processing returns to step S10, which is shown in FIG. 7, without doing anything.

If the second gear is currently selected, step 140 is performed, without regard to the mode selected with the mode switch 21, to judge whether the current vehicle velocity is appropriate for a shift to first gear (smaller than the vehicle velocity threshold value for a second-to-first gear shifting point). If the query in step S140 is answered "Yes," step S142 is performed to output an instruction signal to the first-gear clutch switching solenoid valve 53 for the purpose of changing the transmission 12 to the first gear. If, on the other hand, the query is answered "No," processing returns to step S10, which is shown in FIG. 7, without doing anything. If the first gear is currently selected, processing returns to step S10, which is shown in FIG. 7, without doing anything. If none of the first to fourth gears is currently selected, an error process is performed in a similar manner, for instance, to step S90 (step S130->step S170).

When the gear shifting switch 25 is placed in a first-gear position, automatic gear shifting control is exercised so that the first gear is eventually selected as described above.

Figure 9:
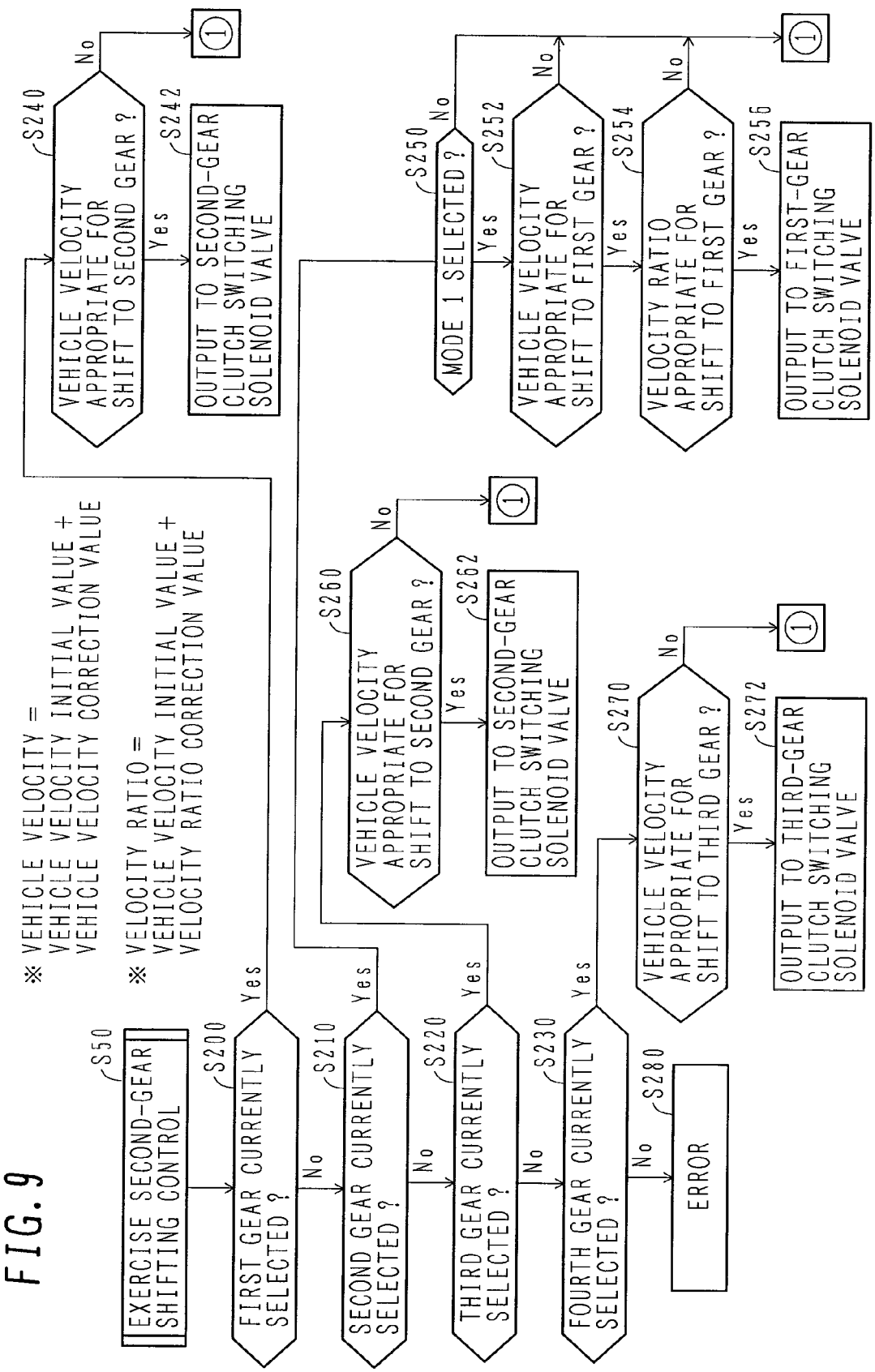
FIG. 9 is a flowchart illustrating the details of a second-gear shifting control process that is shown in FIG. 7.

FIG. 9 is a flowchart illustrating the details of the second-gear shifting control process shown in FIG. 7. In the second-gear shifting control process, steps S200 to S230 are similarly performed to judge whether the first gear, second gear, third gear, or fourth gear is currently selected, and a gear shifting process is performed in accordance with the obtained judgment result. The process performed when the third or fourth gear is currently selected is the same as the first-gear shifting control process. More specifically, if the fourth gear is currently selected, step S270 is performed, depending on the mode selected with the mode switch 21, to judge whether the current vehicle velocity is appropriate for a shift to third gear (smaller than the vehicle velocity threshold value for a fourth-to-third gear shifting point). If the query in step S270 is answered "Yes," step S272 is performed to output an instruction signal to the third-gear clutch switching solenoid valve 55 for the purpose of changing the transmission 12 to the third gear. If, on the other hand, the query is answered "No," processing returns to step S10, which is shown in FIG. 7, without doing anything. If the third gear is currently selected, step S260 is performed, depending on the mode selected with the mode switch 21, to judge whether the current vehicle velocity is appropriate for a shift to second gear (smaller than the vehicle velocity threshold value for a third-to-second gear shifting point). If the query in step S260 is answered "Yes," step S262 is performed to output an instruction signal to the second-gear clutch switching solenoid valve 54 for the purpose of changing the transmission 12 to the second gear. If, on the other hand, the query is answered "No," processing returns to step S10, which is shown in FIG. 7, without doing anything.

However, if the second gear is currently selected, step S250 is performed to judge whether automatic gear shifting mode 1 is selected with the mode switch 21. If the query in step S250 is answered "Yes," steps S252 and S254 are performed to judge whether the current vehicle velocity is appropriate for a shift to first gear (smaller than the vehicle velocity threshold value for a second-to-first gear shifting point) and judge whether the current gear ratio is appropriate for a shift to first gear (smaller than the velocity ratio threshold value for a second-to-first gear shifting point). If the queries in steps S252 and S254 are both answered "Yes," step S256 is performed to output an instruction signal to the first-gear clutch switching solenoid valve 53 for the purpose of changing the transmission 12 to the first gear. If, on the other hand, either of the queries is answered "No," processing returns to step S10, which is shown in FIG. 7, without doing anything. The current velocity ratio can be determined by the value computed by the velocity ratio computation section 40.

If the first gear is currently selected, step 240 is performed, without regard to the mode selected with the mode switch 21, to judge whether the current vehicle velocity is appropriate for a shift to second gear (greater than the vehicle velocity threshold value for a first-to-second gear shifting point). If the query in step S240 is answered "Yes," step S242 is performed to output an instruction signal to the second-gear clutch switching solenoid valve 54 for the purpose of changing the transmission 12 to the second gear. If, on the other hand, the query is answered "No," processing returns to step S10, which is shown in FIG. 7, without doing anything. If none of the first to fourth gears is currently selected, an error process is performed in a similar manner, for instance, to step S90 (step S230->step S280).

When the gear shifting switch 25 is placed in a second-gear position, automatic gear shifting control is exercised so that the first or second gear is selected as described above. Further, gear shifting control is exercised between the first gear and second gear in accordance with the prevailing vehicle velocity and velocity ratio.

Figure 10:
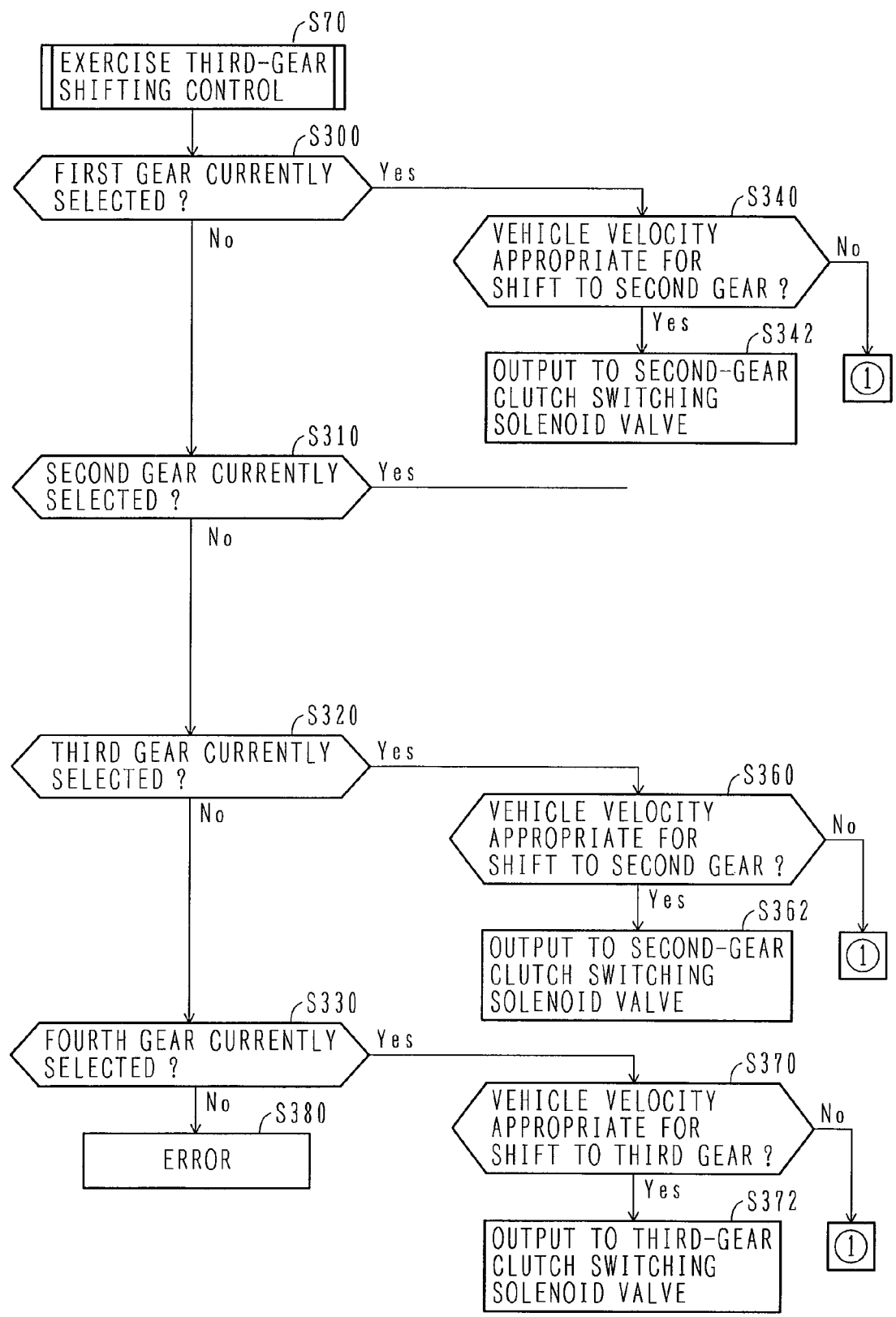
FIG. 10 is a flowchart illustrating the details of a third-gear shifting control process that is shown in FIG. 7.

FIG. 10 is a flowchart illustrating the details of the third-gear shifting control process shown in FIG. 7. In the third-gear shifting control process, steps S300 to S330 are similarly performed to judge whether the first gear, second gear, third gear, or fourth gear is currently selected, and a gear shifting process is performed in accordance with the obtained judgment result. The process performed when the third or fourth gear is currently selected is the same as the first-gear shifting control process. More specifically, if the fourth gear is currently selected, step S370 is performed, depending on the mode selected with the mode switch 21, to judge whether the current vehicle velocity is appropriate for a shift to third gear (smaller than the vehicle velocity threshold value for a fourth-to-third gear shifting point). If the query in step S370 is answered "Yes," step S372 is performed to output an instruction signal to the third-gear clutch switching solenoid valve 55 for the purpose of changing the transmission 12 to the third gear. If, on the other hand, the query is answered "No," processing returns to step S10, which is shown in FIG. 7, without doing anything. If the third gear is currently selected, step S360 is performed, depending on the mode selected with the mode switch 21, to judge whether the current vehicle velocity is appropriate for a shift to second gear (smaller than the vehicle velocity threshold value for a third-to-second gear shifting point). If the query in step S360 is answered "Yes," step S362 is performed to output an instruction signal to the second-gear clutch switching solenoid valve 54 for the purpose of changing the transmission 12 to the second gear. If, on the other hand, the query is answered "No," processing returns to step S10, which is shown in FIG. 7, without doing anything.

However, if the second gear is currently selected, step S350 is performed to judge whether automatic gear shifting mode 1 is selected with the mode switch 21. If the query in step S350 is answered "Yes," steps S352 and S354 are performed to judge whether the current vehicle velocity is appropriate for a shift to first gear (smaller than the vehicle velocity threshold value for a second-to-first gear shifting point) and judge whether the current gear ratio is appropriate for a shift to first gear (smaller than the velocity ratio threshold value for a second-to-first gear shifting point). If the queries in steps S352 and S354 are both answered "Yes," step S353 is performed to output an instruction signal to the first-gear clutch switching solenoid valve 53 for the purpose of changing the transmission 12 to the first gear. If the query in step S350 or S351 is answered "No," steps S354 and S355 are performed, depending on the mode selected with the mode switch 21, to judge whether the current vehicle velocity is appropriate for a shift to third gear (greater than the vehicle velocity threshold value for a second-to-third gear shifting point) and judge whether the current gear ratio is appropriate for a shift to third gear (greater than the velocity ratio threshold value for a second-to-third gear shifting point). If the queries in steps S354 and S355 are both answered "Yes," step S356 is performed to output an instruction signal to the third-gear clutch switching solenoid valve 55 for the purpose of changing the transmission 12 to the third gear. In the other cases, processing returns to step S10, which is shown in FIG. 7, without doing anything.

The process performed when the first gear is currently selected is the same as that is performed for second-gear shifting control. More specifically, if the first gear is currently selected, step S340 is performed, without regard to the mode selected with the mode switch 21, to judge whether the current vehicle velocity is appropriate for a shift to second gear (greater than the vehicle velocity threshold value for a first-to-second gear shifting point). If the query in step S340 is answered "Yes," step S342 is performed to output an instruction signal to the second-gear clutch switching solenoid valve 54 for the purpose of changing the transmission 12 to the second gear. If, on the other hand, the query is answered "No," processing returns to step S10, which is shown in FIG. 7, without doing anything. If none of the first to fourth gears is currently selected, an error process is performed in a similar manner, for instance, to step S90 (step S330->step S380).

When the gear shifting switch 25 is placed in a third-gear position, automatic gear shifting control is exercised so that the first, second, or third gear is selected as described above. Further, gear shifting control is exercised between the first gear and third gear in accordance with the prevailing vehicle velocity and velocity ratio.

Figure 11:
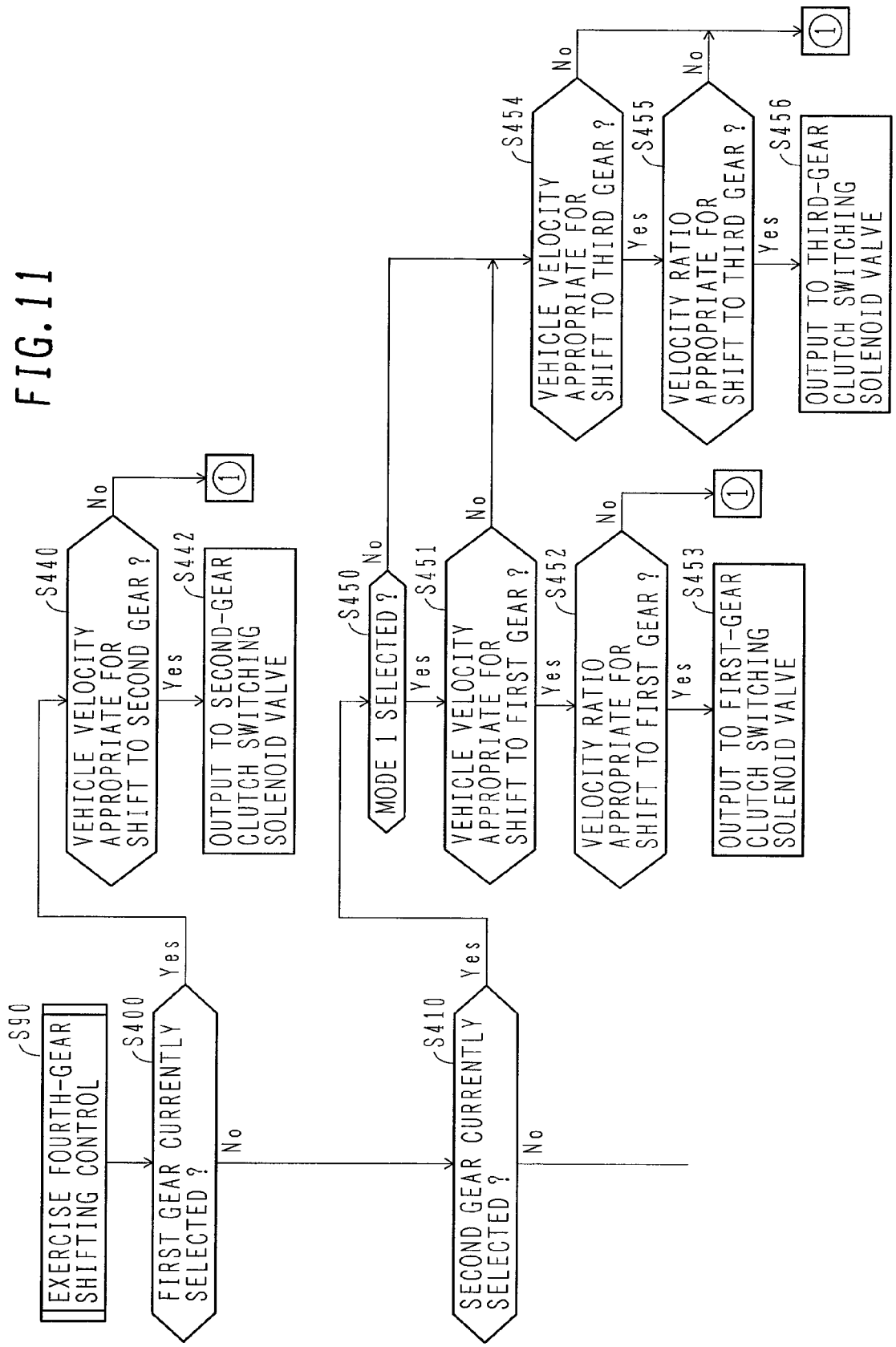
FIG. 11 is a flowchart illustrating the details of a fourth-gear shifting control process that is shown in FIG. 7.

FIG. 11 is a flowchart illustrating the details of the fourth-gear shifting control process shown in FIG. 7. In the fourth-gear shifting control process, steps S400 to S430 are similarly performed to judge whether the first gear, second gear, third gear, or fourth gear is currently selected, and a gear shifting process is performed in accordance with the obtained judgment result. The process performed when the fourth gear is currently selected is the same as the first-gear shifting control process. More specifically, if the fourth gear is currently selected, step S470 is performed, depending on the mode selected with the mode switch 21, to judge whether the current vehicle velocity is appropriate for a shift to third gear (smaller than the vehicle velocity threshold value for a fourth-to-third gear shifting point). If the query in step S470 is answered "Yes," step S472 is performed to output an instruction signal to the third-gear clutch switching solenoid valve 55 for the purpose of changing the transmission 12 to the third gear. If, on the other hand, the query is answered "No," processing returns to step S10, which is shown in FIG. 7, without doing anything.

However, if the third gear is currently selected, step S460 is performed, depending on the mode selected with the mode switch 21, to judge whether the current vehicle velocity is appropriate for a shift to second gear (smaller than the vehicle velocity threshold value for a third-to-second gear shifting point). If the query in step S460 is answered "Yes," step S462 is performed to output an instruction signal to the second-gear clutch switching solenoid valve 54 for the purpose of changing the transmission 12 to the second gear. If, on the other hand, the query is answered "No," steps S464 and S466 are performed, depending on the mode selected with the mode switch 21, to judge whether the current vehicle velocity is appropriate for a shift to fourth gear (greater than the vehicle velocity threshold value for a third-to-fourth gear shifting point) and judge whether the current gear ratio is appropriate for a shift to fourth gear (greater than the gear ratio threshold value for a third-to-fourth gear shifting point). If the queries in steps S464 and S466 are both answered "Yes," step S468 is performed to output an instruction signal to the fourth-gear clutch switching solenoid valve 56 for the purpose of changing the transmission 12 to the fourth gear. If, on the other hand, the query is answered "No," processing returns to step S10, which is shown in FIG. 7, without doing anything.

The process performed when the second or first gear is currently selected is the same as that is performed for third-gear shifting control. More specifically, when the second gear is currently selected, step S450 is performed to judge whether automatic gear shifting mode 1 is selected with the mode switch 21. If the query in step S450 is answered "Yes," steps S52 and S454 are performed to judge whether the current vehicle velocity is appropriate for a shift to first gear (smaller than the vehicle velocity threshold value for a second-to-first gear shifting point) and judge whether the current gear ratio is appropriate for a shift to first gear (smaller than the velocity ratio threshold value for a second-to-first gear shifting point). If the queries in steps S52 and S454 are both answered "Yes," step S453 is performed to output an instruction signal to the first-gear clutch switching solenoid valve 53 for the purpose of changing the transmission 12 to the first gear. If either of the queries in steps S450 and S451 is answered "No," steps S454 and S455 are performed, depending on the mode selected with the mode switch 21, to judge whether the current vehicle velocity is appropriate for a shift to third gear (greater than the vehicle velocity threshold value for a second-to-third gear shifting point) and judge whether the current gear ratio is appropriate for a shift to third gear (greater than the gear ratio threshold value for a second-to-third gear shifting point). If the queries in steps S454 and S455 are both answered "Yes," step S456 is performed to output an instruction signal to the third-gear clutch switching solenoid valve 55 for the purpose of changing the transmission 12 to the third gear. In the other cases, processing returns to step S10, which is shown in FIG. 7, without doing anything.

If the first gear is currently selected, step S440 is performed, without regard to the mode selected with the mode switch 21, to judge whether the current vehicle velocity is appropriate for a shift to second gear (greater than the vehicle velocity threshold value for a first-to-second gear shifting point). If the query in step S440 is answered "Yes," step S442 is performed to output an instruction signal to the second-gear clutch switching solenoid valve 54 for the purpose of changing the transmission 12 to the second gear. If, on the other hand, the query is answered "No," processing returns to step S10, which is shown in FIG. 7, without doing anything. If none of the first to fourth gears is currently selected, an error process is performed in a similar manner, for instance, to step S90 (step S430->step S480).

When the gear shifting switch 25 is placed in a fourth-gear position, automatic gear shifting control is exercised so that the first, second, third, or fourth gear is selected as described above. Further, gear shifting control is exercised between the first gear and fourth gear in accordance with the prevailing vehicle velocity and velocity ratio.

Next, the learning mode threshold value correction process will be described in detail with reference to FIGS. 12 to 20.

First of all, typical screens displayed on the display device 49 in the learning mode will be described with reference to FIGS. 12 to 20.

Figure 12:
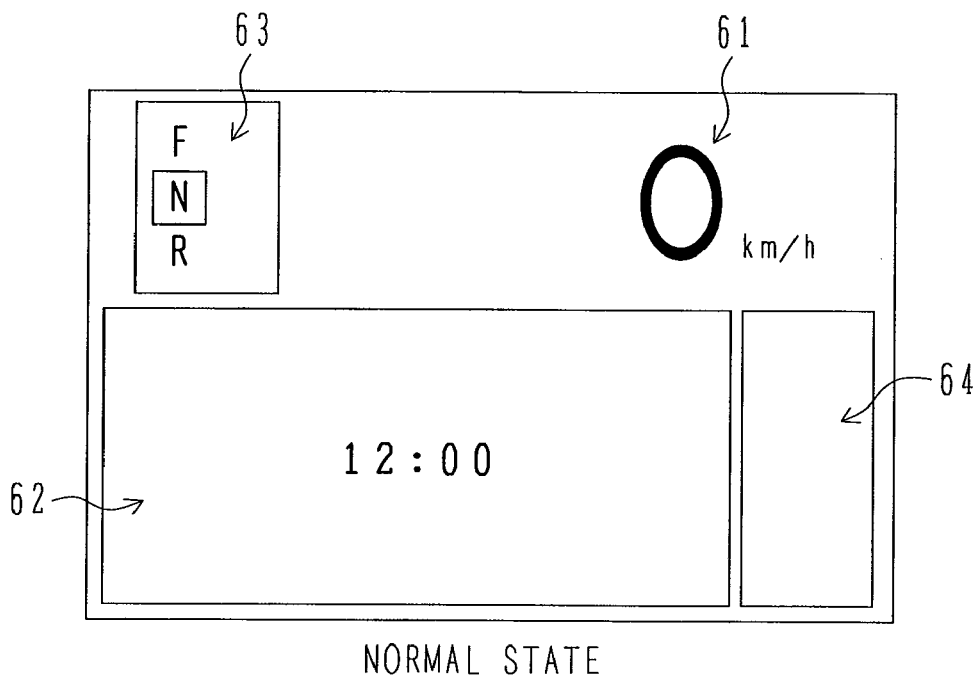
FIG. 12 shows a normal mode screen of a display device.

FIG. 12 shows a normal mode screen of the display device 49. The normal mode screen has four areas 61, 62, 63, 64. The area 61 shows the vehicle velocity. The area 62 shows the present time. The area 63 shows the current position (F, N, or R) of the forward/reverse travel selector switch 24 as well as the currently selected gear. The area 64 shows nothing.

Figure 13:
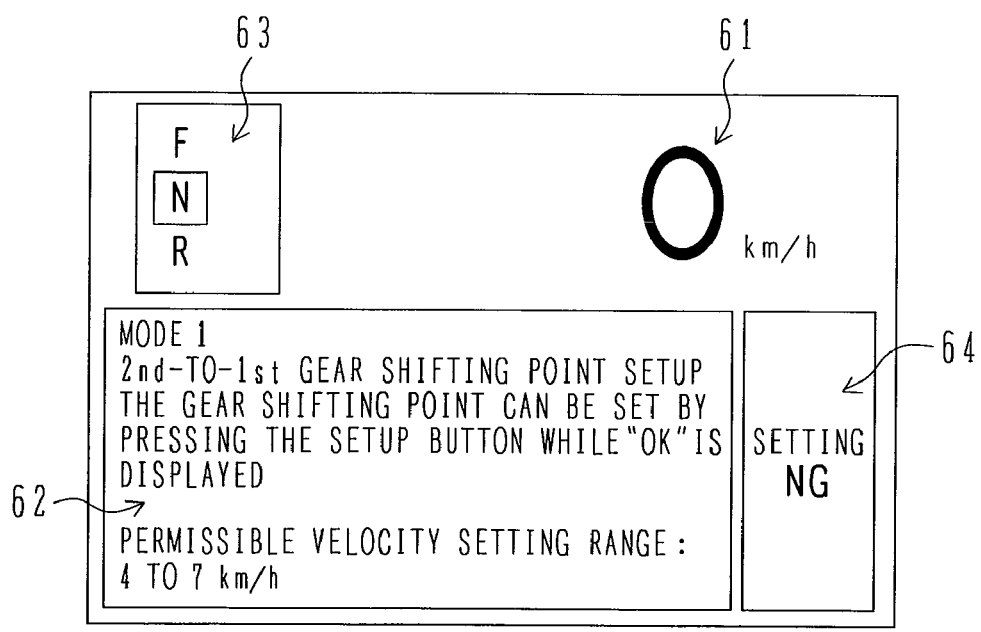
FIG. 13 shows a setup start screen for setting a second-to-first gear shifting point (vehicle velocity threshold value AD1 and velocity ratio threshold value X1 in FIG. 4) for automatic gear shifting mode 1 in a learning mode.

FIG. 13 shows a setup start screen for setting threshold values for a second-to-first gear shifting point (vehicle velocity threshold value AD1 and velocity ratio threshold value X1 in FIG. 4) for automatic gear shifting mode 1 in the learning mode. When the learning mode is selected in automatic gear shifting mode 1, the display device 49 switches from the normal mode screen shown in FIG. 12 to the setup start screen shown in FIG. 13. In the setup start screen, the area 62 changes from a present time area to a guidance area that furnishes the operator with the information for gear shifting point setup. Further, the area 64 displays guidance information that notifies the operator whether a gear shifting point setting is acceptable (this area initially reads "Setting NG" to indicate that the setting is unacceptable).

Figure 14:
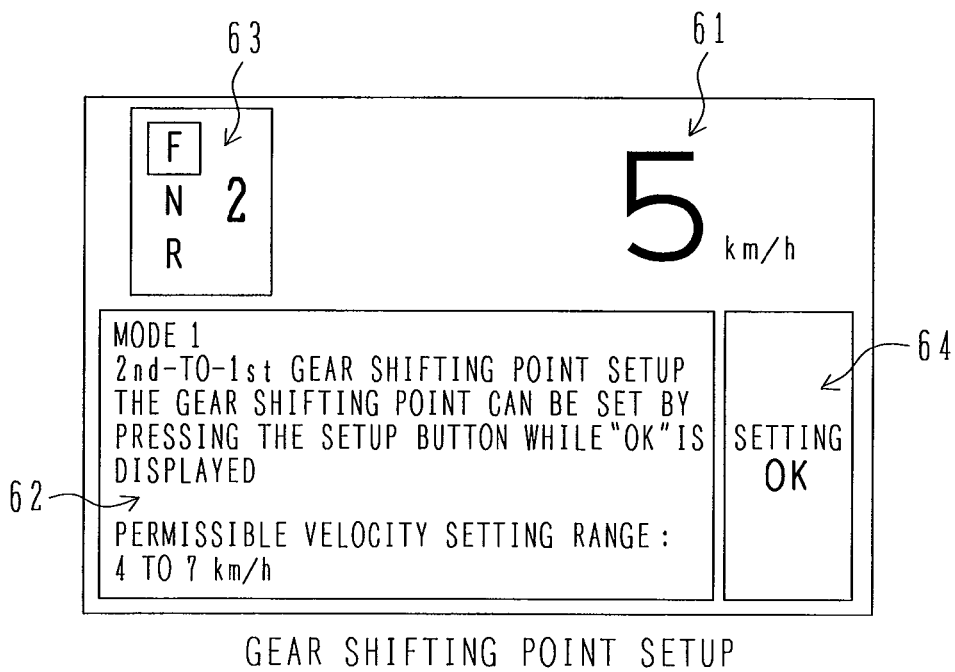
FIG. 14 shows a setup screen for setting a second-to-first gear shifting point for automatic gear shifting mode 1 in the learning mode.

FIG. 14 shows a setup acceptance screen indicating that the threshold value for a second-to-first gear shifting point can be set for automatic gear shifting mode 1 in the learning mode. This screen differs from the setup start screen, which is shown in FIG. 13, in that the guidance displayed in the area 64 is changed to read "Setting OK."

Figure 15:
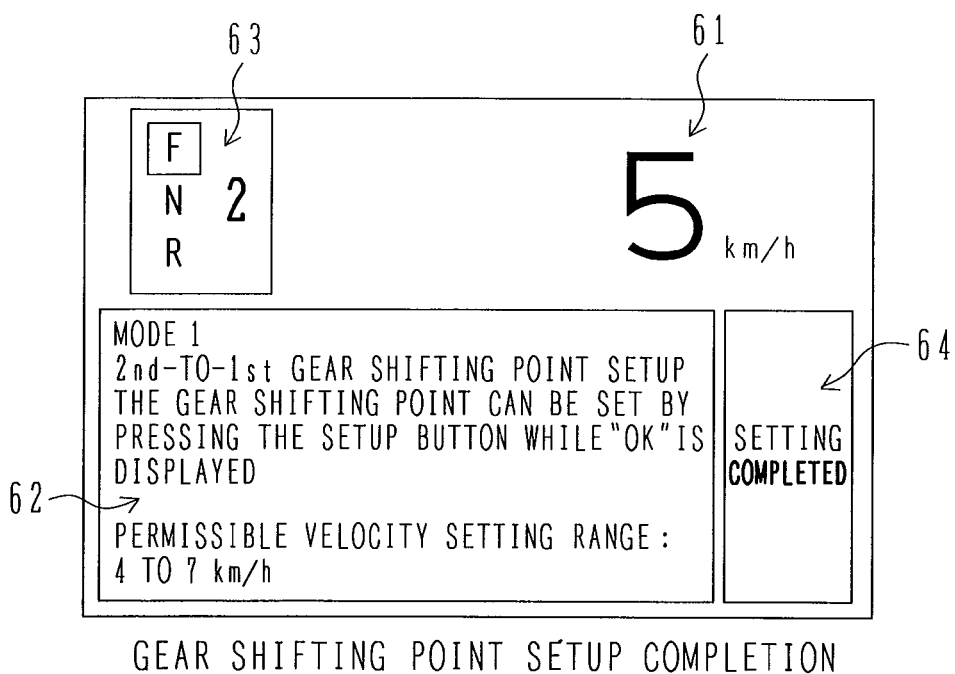
FIG. 15 shows a setup completion screen for a second-to-first gear shifting point for automatic gear shifting mode 1 in the learning mode.

FIG. 15 shows a setup completion screen indicating that the threshold value for a second-to-first gear shifting point is set for automatic gear shifting mode 1 in the learning mode. This screen differs from a gear shifting point setup screen, which is shown in FIG. 14, in that the guidance displayed in the area 64 is changed to read "Setup completed."

Figure 16:
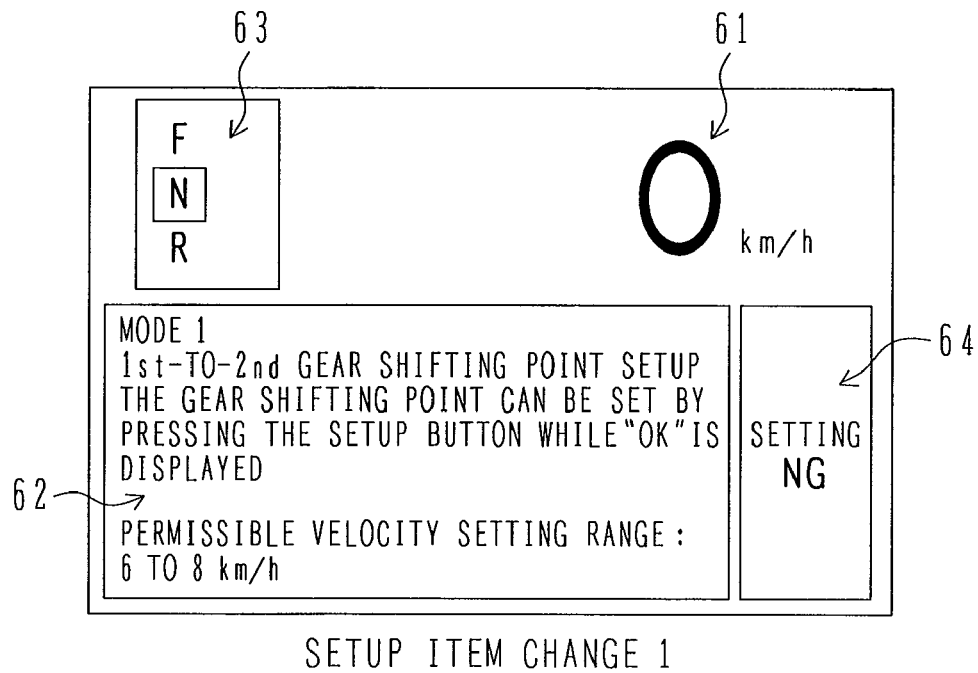
FIG. 16 shows a setup start screen for setting a first-to-second gear shifting point (vehicle velocity threshold value AU1 in FIG. 4) for automatic gear shifting mode 1 in the learning mode.
Figure 17:
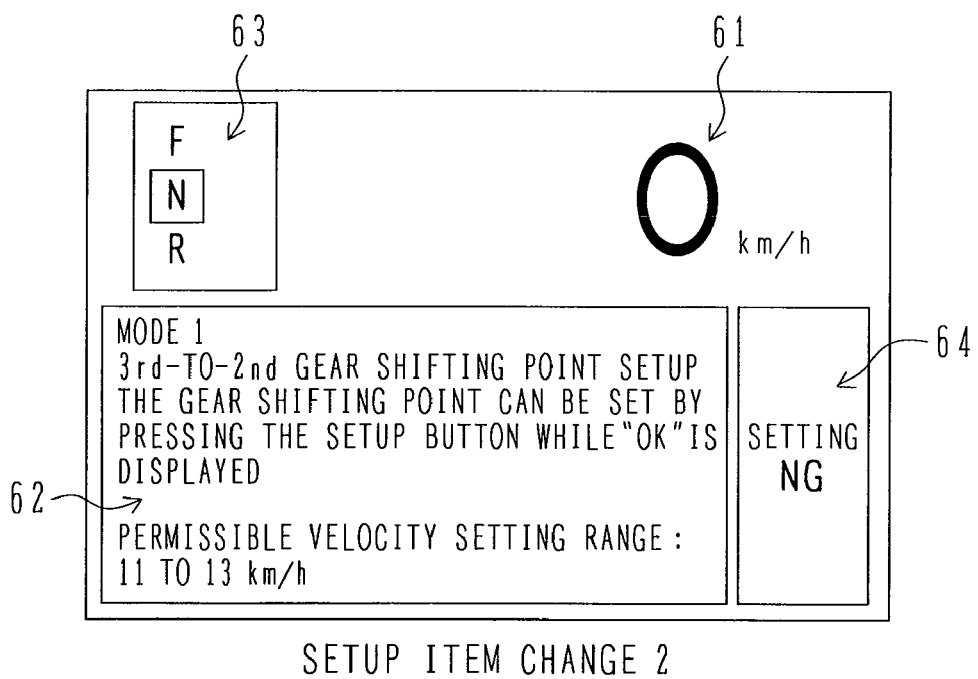
FIG. 17 shows a setup start screen for setting a third-to-second gear shifting point (vehicle velocity threshold value BD1 in FIG. 4) for automatic gear shifting mode 1 in the learning mode.
Figure 18:
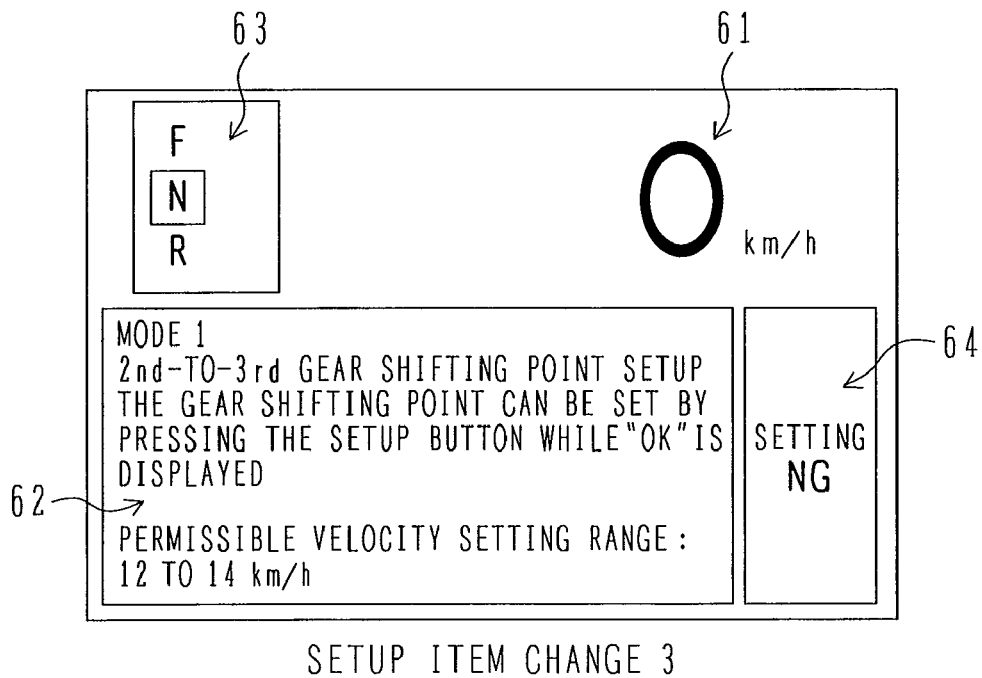
FIG. 18 shows a setup start screen for setting a second-to-third gear shifting point (vehicle velocity threshold value BU1 and velocity ratio threshold value Y1 in FIG. 4) for automatic gear shifting mode 1 in the learning mode.
Figure 19:
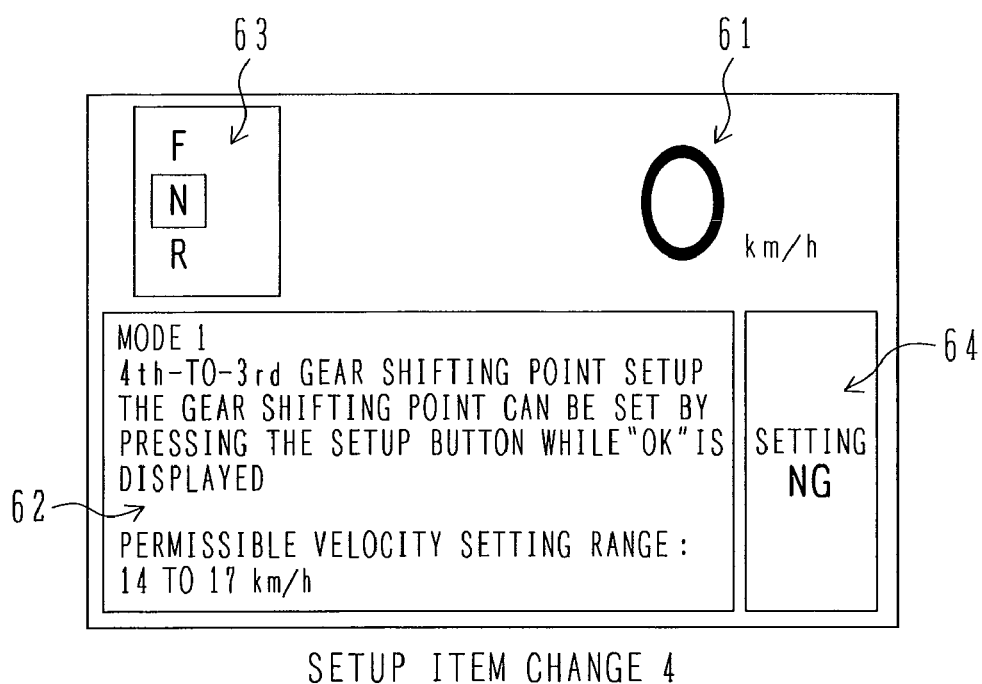
FIG. 19 shows a setup start screen for setting a fourth-to-third gear shifting point (vehicle velocity threshold value CD1 in FIG. 4) for automatic gear shifting mode 1 in the learning mode.
Figure 20:
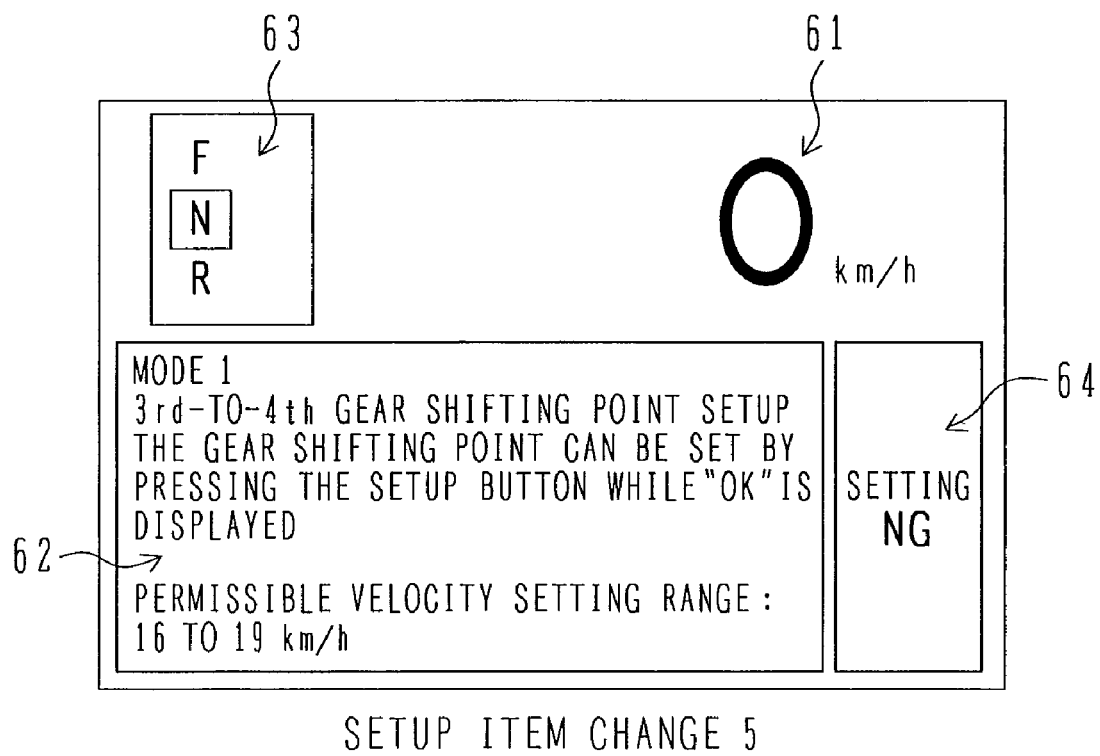
FIG. 20 shows a setup start screen for setting a third-to-fourth gear shifting point (vehicle velocity threshold value CU1 and velocity ratio threshold value Z1 in FIG. 4) for automatic gear shifting mode 1 in the learning mode.

FIGS. 16 to 20 show setup start screens for setting threshold values for the other gear shifting points for automatic gear shifting mode 1 in the learning mode. FIG. 16 shows a setup start screen for setting the threshold value (vehicle velocity threshold value AU1 in FIG. 4) for a first-to-second gear shifting point. FIG. 17 shows a setup start screen for setting the threshold value (vehicle velocity threshold value BD1 in FIG. 4) for a third-to-second gear shifting point. FIG. 18 shows a setup start screen for setting the threshold values (vehicle velocity threshold value BU1 and velocity ratio threshold value Y1 in FIG. 4) for a second-to-third gear shifting point. FIG. 19 shows a setup start screen for setting the threshold value (vehicle velocity threshold value CD1 in FIG. 4) for a fourth-to-third gear shifting point. FIG. 20 shows a setup start screen for setting the threshold values (vehicle velocity threshold value CU1 and velocity ratio threshold value Z1 in FIG. 4) for a third-to-fourth gear shifting point.

In the learning mode for automatic gear shifting modes 2 and 3, the same setup start screen, setup acceptance screen, and setup completion screen as described above appear on the display device 49.

The learning mode threshold value correction process that is performed, for instance, with automatic gear shifting mode 1 selected with the mode switch 21 will now be described in detail with reference to a flowchart in FIG. 21.

First of all, the transmission gear shifting control section 45 judges whether the setup start switch 22 is pressed and then immediately released (that is, whether the setup start switch 22 is pressed once) (steps S500 and S505). If the queries in steps S500 and S505 are answered "Yes," it is concluded that the learning mode is selected, and step S510 is performed so that the display device 49 switches from the normal mode screen shown in FIG. 12 to the setup start screen shown in FIG. 13. Further, the area 64 of the setup start screen changes to read "Setting NG" (step S515). Whether the setting is "OK" or "NG" depends on the vehicle velocity. If the vehicle velocity is within a permissible velocity setting range (within a range of 4 to 7 km/h when, for instance, a second-to-first gear shifting point is set in automatic gear shifting mode 1), the setting is "OK." If the vehicle velocity is not within the permissible velocity setting range, the setting is "NG." It is recommended, in the interest of safety, that learning mode setup be performed while the vehicle body is stopped. Immediately after the display device 49 switches from the normal mode screen shown in FIG. 12 to the setup start screen shown in FIG. 13, the vehicle body is stopped so that the area 64 reads "Setting NG."

Next, step S520 is performed to judge whether the setup start switch 22 is pressed once again. If the setup start switch 22 is pressed once (if the query in step S520 is answered "No"), processing returns to step S510 so that the display device 49 switches from the setup start screen shown in FIG. 13 to the setup start screen shown in FIG. 16, and then steps S515 and S520 are performed again. Steps S520, S510, and S515 are repeatedly performed each time the setup start switch 22 is pressed so that the display device 49 sequentially switches from the setup start screen shown in FIG. 13 through the setup start screen shown in FIG. 16, the setup start screen shown in FIG. 17, the setup start screen shown in FIG. 18, the setup start screen shown in FIG. 19, and the setup start screen shown in FIG. 20 to the setup start screen shown in FIG. 13. This makes it possible to freely select a gear shifting point for which a threshold value should be set in automatic gear shifting mode 1.

Next, step S525 is performed to judge whether the vehicle velocity is within the permissible velocity setting range. If the query in step S525 is answered "Yes," step S530 is performed so that the guidance displayed in the area 64 changes to read "Setting OK" (indicate that the setting is acceptable). Step S535 is then performed to wait until the setup switch 23 is pressed. If the setup switch 23 is not pressed during such a wait, steps S535, S525, and S530 are repeatedly performed. If the vehicle velocity is outside the permissible velocity setting range during such a wait, processing returns to step S515 so that the guidance displayed in the area 64 changes to read "Setting NG." Further, steps S520, S510, S515, S525, S530, and S535 are performed again.

If the setup switch 23 is pressed while the area 64 reads "Setting OK" (indicates that the setting is acceptable), steps S540 and S545 are performed to calculate the adjustment values for the velocity ratio threshold value and vehicle velocity threshold value in accordance with the prevailing velocity ratio and vehicle velocity, and store the calculated adjustment values in the adjustment value storage section 43. The following equations are used to calculate the adjustment values for the velocity ratio threshold value and vehicle velocity threshold value.

Adjustment value for velocity ratio threshold value=initial value for velocity ratio threshold value−current velocity ratio Adjustment value for vehicle velocity threshold value=initial value for vehicle velocity threshold value−current vehicle velocity The initial value for velocity ratio threshold value and initial value for vehicle velocity threshold value are stored in the gear shift timing storage section 44. The transmission gear shifting control section 45 reads the initial values from the gear shift timing storage section 44. The current velocity ratio and current vehicle velocity are determined from values computed by the velocity ratio computation section 40 and vehicle velocity computation section 41.

When the adjustment values for the velocity ratio threshold value and vehicle velocity threshold value are determined as described above and stored in the adjustment value storage section 43, step S550 is performed so that the display device 49 switches to the setup completion screen shown in FIG. 15. Processing then terminates.

In steps S500 and S505, the time interval between the instant at which the setup start switch 22 is pressed and the instant at which the switch 22 is released (no longer depressed) is counted (step S560). When the counted time interval exceeds a predetermined value, all the adjustment values stored in the adjustment storage section 43 are deleted (steps S565, S570, and S575). Judging whether the predetermined value is exceeded by the time interval between the instant at which the setup start switch 22 is pressed and the instant at which the switch 22 is released (no longer depressed) is equivalent to judging whether the setup start switch 22 is held down for at least a predetermined period of time. It means that holding down the setup start switch 22 for at least the predetermined period of time deletes all the adjustment values stored in the adjustment value storage section 43 (resets the adjustment values to zero). The gear shifting control threshold values then revert to the initial values stored in the gear shift timing storage section 44.

In the embodiment described above, the engine rotation sensor 26, the torque converter output rotation sensor 27, the transmission output shaft rotation sensor 29, the controller 30, the engine rotation computation section 36, the torque converter output rotation computation section 37, the velocity ratio computation section 40, the transmission output shaft rotation computation section 39, the vehicle velocity computation section 41, the processing functions of the transmission gear shifting control section 45 that are exercised in steps S10 to S90 in FIG. 7, the gear shift timing storage section 44, and the adjustment value storage section 43 constitute the automatic gear shifting control means having an automatic gear shifting mode in which the gear ratio in the transmission 12 is changed based on a preset threshold value of gear shifting control thereby to perform gear shifting of the transmission 12. The setup start switch 22, the setup switch 23, the setup start switch judgment section 32, the setup switch judgment section 33, the processing functions of the transmission gear shifting control section 45 that are exercised in steps S500 to S550 in FIG. 21, and the adjustment value storage section 43 constitute the learning correction means for learning desired gear shifting conditions in response to an operator intervention while the wheel loader 100, which is a work machine, travels, and correcting the gear shifting control threshold value so as to obtain the gear shifting conditions.

The setup switch 23 constitutes the first operating means, which is operated by the operator. The processing functions of the transmission gear shifting control section 45 that are exercised in steps S500 to S550 in FIG. 21, and the adjustment value storage section 43 constitute the gear shifting condition acquisition means, which acquires gear shifting conditions prevailing when the first operating means is operated and stores a value for acquiring the gear shifting conditions. The processing function of the transmission gear shifting control section 45 that is exercised in step S4 in FIG. 7 constitutes the first threshold value setup means, which sets a gear shifting control threshold value by using a value stored in the gear shifting condition acquisition means.

The setup start switch 22 constitutes the second operating means, which is used to choose between the normal mode and the learning mode. The processing functions of the transmission gear shifting control section 45 that are exercised in steps S500 and S505 in FIG. 21 constitute the means for causing the gear shifting condition acquisition means to function when the learning mode is selected.

The processing function of the transmission gear shifting control section 45 that is exercised in step S6 in FIG. 7 constitutes the second threshold value setup means, which sets a gear shifting control threshold value for the learning mode. The processing function of the transmission gear shifting control section 45 that is exercised in step S2 in FIG. 7 constitutes the threshold value switching means, which causes the first threshold value setup means to set a gear shifting control threshold value when the normal mode is selected, and causes the second threshold value setup means to set a gear shifting control threshold value when the learning mode is selected.

In the present embodiment, the gear shifting condition acquisition means stores the value for obtaining the acquired gear shifting conditions as an adjustment value for a gear shifting control threshold value. The threshold value setup means sets the gear shifting control threshold value by using the adjustment value for the threshold value and a preset initial value for the threshold value. More specifically, the gear shifting condition acquisition means calculates the difference between an acquired gear shifting condition and the initial value for the gear shifting control threshold value, and stores the difference as the adjustment value. The first threshold value setup means adds the difference to the initial value for the gear shifting control threshold value, and sets the resulting value as the gear shifting control threshold value. The gear shifting condition acquisition means may directly store the acquired gear shifting conditions (vehicle velocity and velocity ratio) as adjustment values instead of storing the difference between an acquired gear shifting condition and the initial value for a gear shifting control threshold value as an adjustment value. Further, the first threshold value setup means may directly set the adjustment values as the gear shifting control threshold values.

Figure 21:
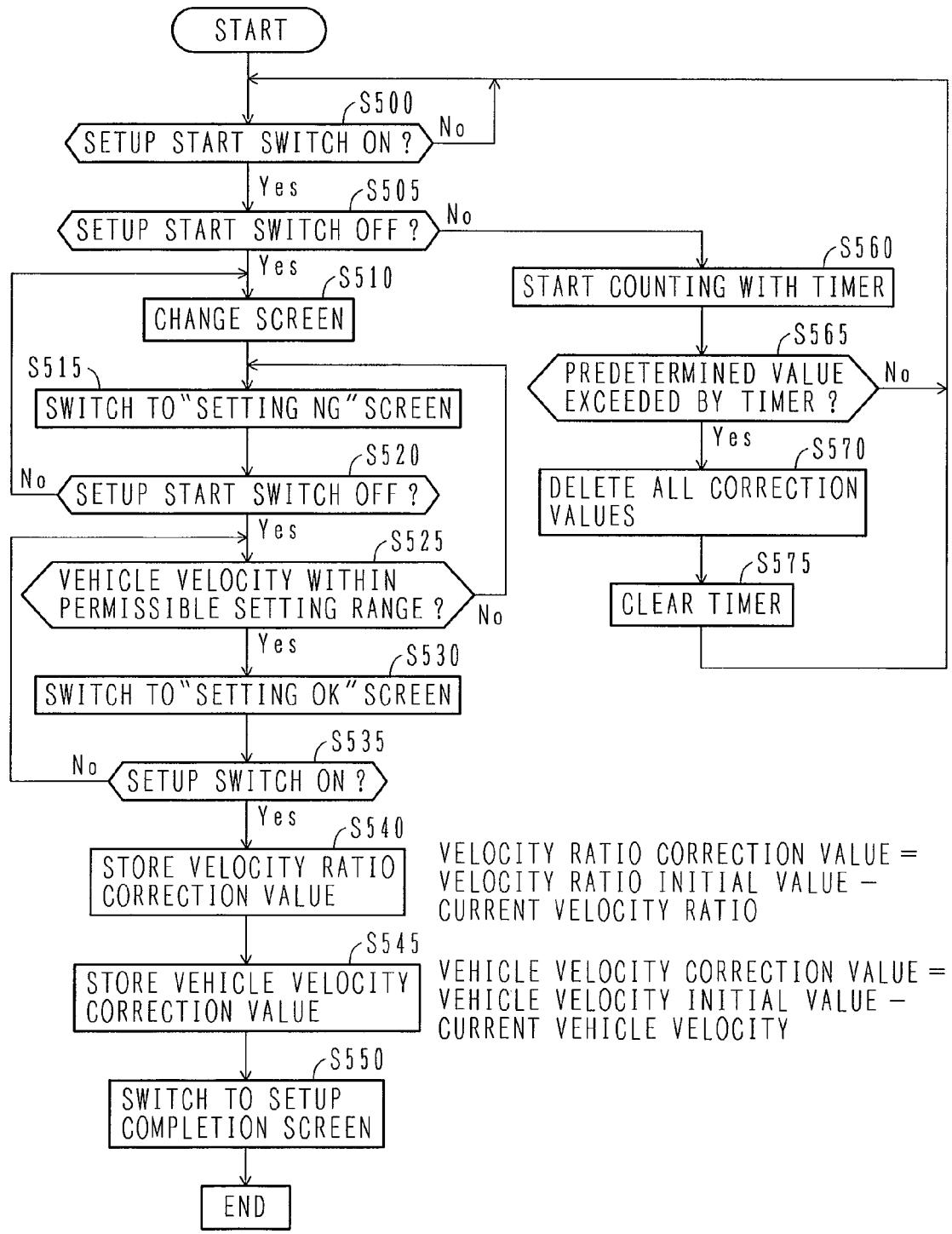
FIG. 21 is a flowchart illustrating the details of a threshold value correction process for gear shifting control in the learning mode.

The processing function of the transmission gear shifting control section 45 that is exercised in step S525 in FIG. 21 further constitutes the gear shifting condition acquisition permission means, which permits the gear shifting condition acquisition means to acquire gear shifting conditions only when the acquired gear shifting conditions are within a permissible setting range. The processing function of the transmission gear shifting control section 45 that is exercised in step S530 in FIG. 21 and the area 64 of the display device 49 constitute the first display means, which displays a guidance that indicates whether gear shifting condition acquisition is permitted by the gear shifting condition acquisition permission means. The area 62 of the display device 49 constitutes the second display means, which displays a guidance that indicates whether the current gear shifting conditions are within the permissible setting range.

The processing functions of the transmission gear shifting control section 45 that are exercised in steps S505 and S560 to S575 in FIG. 21 constitute the learning/correction reset means, which allows the operator to reset the gear shifting control threshold value to the initial value.

The operation performed by the gear shifting control system according to the present embodiment, which is configured as described above, will now be described.

First of all, a normal gear shifting control operation will be described. The operator selects automatic gear shifting mode 1, 2, or 3 with the mode switch 21. If the setup start switch 22 is not pressed subsequently, the transmission gear shifting control section 45 reads the initial and adjustment values for normal gear shifting control threshold values that are stored in the gear shift timing storage section 44 and adjustment value storage section 43 and related to the selected gear shifting mode, sets a normal gear shifting control threshold value shown in FIGS. 4 to 6 (steps SS2 and S4 in FIG. 7) by using the read values, outputs an instruction signal to the associated solenoid valves 51-56 by using the normal gear shifting control threshold value, the vehicle velocity information from the vehicle velocity computation section 41, the velocity ratio information from the velocity ratio computation section 40, and the forward/reverse travel signal and gear shifting signal from the forward/reverse travel selector switch 24 and gear shifting switch 25, and exercises forward/reverse travel control and appropriate automatic gear shifting control (steps S10 to S80 in FIG. 7).

When, for instance, in automatic gear shifting mode 1 shown in FIG. 4, the vehicle velocity exceeds the threshold value BU1 (e.g., 12 km/h) and the velocity ratio exceeds the threshold value Y1 (e.g., 0.8), the vehicle shifts from second gear to third gear. When the vehicle velocity exceeds the threshold value CU1 (e.g., 17 km/h) and the velocity ratio exceeds the threshold value Z1 (e.g., 0.8), the vehicle shifts from third gear to fourth gear. When the vehicle velocity decreases below the threshold value CD1 (e.g., 15 km/h), the vehicle shifts from fourth gear to third gear. When the vehicle velocity decreases below the threshold value BD1 (e.g., 10 km/h), the vehicle shifts from third gear to second gear. Further, when the vehicle velocity decreases below the threshold value AD1 (e.g., 5 km/h) with the velocity ratio decreasing below the threshold value X1 (e.g., 0.6) while the second gear is selected, the vehicle shifts to first gear. When the vehicle velocity exceeds the threshold value AU1, the vehicle shifts from first gear to second gear.

In automatic gear shifting modes 2 and 3, which are shown in FIGS. 5 and 6, the threshold values for the gear shifting point between second and third gears and for the gear shifting point between third and fourth gears differ from those in automatic gear shifting mode 1. Setup performed for automatic gear shifting modes 2 and 3 is such that the threshold values sequentially decreases. In automatic gear shifting modes 2 and 3, the vehicle does not shift to first gear.

Automatic gear shifting modes 1 and 2 are suitable for hill climbing. Automatic gear shifting mode 1 is more suitable for steep-slope climbing, which imposes high traveling load on the vehicle, than automatic gear shifting mode 2. In automatic gear shifting mode 1, the vehicle can shift to first gear. Therefore, automatic gear shifting mode 1 is suitable for excavation in which traveling tractive force is exerted to push the bucket 111 (see FIG. 1) into natural ground. Automatic gear shifting mode 3 is suitable for high-speed traveling along a flat path, which does not impose high traveling load on the vehicle.

The operation performed in the learning mode will now be described. When the setup start switch 22 is pressed after automatic gear shifting mode 1, 2, or 3 is selected with the mode switch 21, the learning mode is selected (steps S500 to S510 in FIG. 21). In the learning mode, the transmission gear shifting control section 45 accesses the gear shift timing storage section 44, reads a learning mode gear shifting control threshold value that relates to the selected gear shifting mode, and sets the learning mode gear shifting control threshold value (steps S2 and S6 in FIG. 7). Next, the transmission gear shifting control section 45 performs a predetermined computation process by using the vehicle velocity information from the vehicle velocity computation section 41 and the forward/reverse travel signal and gear shifting signal from the forward/reverse travel selector switch 24 and gear shifting switch 25, and outputs an instruction signal to the associated solenoid valves 51-56 in accordance with the processing result to exercise forward/reverse travel control and automatic gear shifting control (steps S10 to S80 in FIG. 7).

When the setup start switch 22 is pressed to select the learning mode, the threshold value correction process can be performed in the learning mode (steps S515 to S550 in FIG. 21).

When a gear shifting control threshold value is to be learned/corrected in the learning mode, the operator presses the setup start switch 22 an appropriate number of times to refresh the setup start screen displayed on the display device 49 in accordance with the number of switch presses and select a desired setup start screen (steps S510 to S520 in FIG. 21). Next, the operator causes the wheel loader to travel. While the wheel loader travels, the area 62 of the display device 49 displays a permissible velocity setting range and setup operation guidance and the area 64 shows a guidance to indicate whether the setting is acceptable (OK) or unacceptable (NG). When the traveling velocity of the wheel loader is within the permissible velocity setting range, the guidance displayed in the area 64 of the display device 49 changes to indicate that the setting is acceptable ("Setting OK") (steps S525 and S530). When, in this instance, the operator presses the setup switch 23 with desired timing, the transmission gear shifting control section 45 acquires the prevailing vehicle velocity and velocity ratio (or vehicle velocity), performs the following calculations so that the acquired vehicle velocity and velocity ratio become the gear shifting control threshold values at the time of normal gear shifting control, and stores the adjustment values in the adjustment value storage section 43 (steps S535 to S545).

Adjustment value for velocity ratio threshold value=initial value for velocity ratio threshold value−current velocity ratio Adjustment value for vehicle velocity threshold value=initial value for vehicle velocity threshold value−current vehicle velocity Consequently, when normal gear shifting control is exercised, threshold value setup can be performed under gear shifting conditions that are acquired in the learning mode by using the initial values for gear shifting control threshold values stored in the gear shift timing storage section 44 and the changed adjustment values stored in the adjustment value storage section 43 (step S4 in FIG. 7).

When the previous threshold values are restored due to a work site change, holding down the setup start switch 22 deletes all the adjustment values stored in the adjustment value storage section 43 (resets the adjustment values to zero) and resets the gear shifting control threshold values to the initial values, which are the standard values stored in the gear shift timing storage section 44 (steps S505 and S575 in FIG. 21).

Typical gear shifting control threshold value setup in the learning mode will now be described.

When, for instance, the wheel loader is used in a quarry, the wheel loader carries obtained gravel to a dump truck standby site as mentioned earlier. If there is a long slope between the quarry and the dump track standby site, the wheel loader must climb the slope. The gradient (tilt) of the slope varies from one work site to another. If the slope cannot be properly handled by manufacturer-defined threshold value settings for gear shifting modes 1 to 3, work efficiency significantly decreases because gears are shifted at a location that is unexpected by the operator.

It would be advantageous if the wheel loader uses the second gear when it climbs a slope in an automatic gear shifting mode, and shifts from second gear to third gear immediately before it completely climbs the slope, because the second gear enables the wheel loader to climb the slope vigorously and the third gear enables the wheel loader to swiftly travel along a flat path, which is encountered after the slope is completely climbed. In a large number of cases, however, the gradient of the slope may be too slight for manufacturer-defined gear shifting mode 1 and too steep for manufacturer-defined gear shifting mode 2. In such an instance, gear shifting mode 1 uses the second gear while the slope is climbed, but continues to use the second gear and does not automatically shift to third gear when the wheel loader travels along a flat path, which is encountered after the slope is completely climbed. Gear shifting mode 2 shifts from second gear to third gear in the middle of the slope, invokes deceleration because the third gear does not generate adequate force, and then shifts to second gear. This cycle is repeated in gear shifting mode 2.

The present embodiment can solve the above problems by learning and setting the gear shifting control threshold values in the learning mode.

First of all, after automatic gear shifting mode 2 is selected with the mode switch 21, for example, the setup start switch 22 is pressed to select the learning mode. The setup start switch 22 is then pressed an appropriate number of times to select the setup start screen for a second-to-third gear shifting point threshold value for automatic gear shifting mode 2. Next, the operator places the forward/reverse travel selector switch 24 in a forward travel position, set the gear shifting switch 25, for instance, to fourth gear (or second or third gear), and starts up the wheel loader. At startup, the transmission 12 uses the second gear. The operator then steps on an accelerator pedal (not shown) to increase the rotation speed of the engine 10. This causes the wheel loader to climb a slope while accelerating. If the vehicle velocity is within the permissible velocity setting range for a second-to-third gear shifting point for automatic gear shifting mode 2 while wheel loader climbs the slope, the guidance displayed in the area 64 of the setup start screen changes to read "Setting OK." It means that the display device 49 has switched to the setup acceptance screen. The operator views this screen, confirms that setup is permitted, and presses the setup switch 23 immediately before the wheel loader completely climbs the slope. The prevailing vehicle velocity and velocity ratio are then learned and stored as the threshold values for the second-to-third gear shifting point (the adjustment values representing the differences from the initial values are actually stored).

When the wheel loader climbs a slope in automatic gear shifting mode 2 after the threshold values for the second-to-third gear shifting point were learned and set as described above, control is exercised so that the wheel loader shifts from second gear to third gear immediately before it completely climbs the slope. Consequently, the wheel loader can vigorously climb the slope by using the second gear. After the wheel loader completely climbs the slope, it can swiftly travel along a flat path by using the third gear, which is encountered after the slope is completely climbed.

As described above, the present embodiment learns and sets the gear shifting control threshold values in such a manner that gear shifting conditions are obtained with a desired timing when the operator actually moves the wheel loader. Therefore, desired gear shifting conditions can be freely set in accordance with the work site conditions. Further, high work efficiency can be attained because desired gear shifting timing is obtained by operating the wheel loader while allowing it to shift gears under the desired gear shifting conditions. In addition, since the present embodiment learns the desired gear shifting conditions when the operator performs an operating procedure during a traveling operation of the wheel loader, it is possible to easily perform setup without having to repeat a trial-and-error process.

Further, the present embodiment permits the gear shifting condition acquisition means to acquire gear shifting conditions only when the gear shifting conditions are within the permissible setting range. Therefore, even when gear shifting control threshold value setup is based on learning and correction, it is possible to perform threshold value setup within an appropriate range that does not affect gear shifting control, and exercise reasonable gear shifting control. Furthermore, the operator can perform threshold value setup with appropriate timing while viewing the guidance displayed in the area 64 of display device 49.

Moreover, the present embodiment causes the area 62 of the display device 49 to display a guidance that indicates whether the current gear shifting conditions are within the permissible setting range. Therefore, the operator who sets the gear shifting control threshold values through learning and correction can set appropriate threshold values without anxiety while viewing the displayed guidance.

In addition, the present embodiment further includes the learning/correction reset means for allowing the operator to reset the gear shifting control threshold values to the initial values. Therefore, the operator can reset the original values (initial values or standard values), which are supplied from the manufacturer, anytime after setting the gear shifting control threshold values through learning and correction.

The invention claimed is:

1. A gear shifting control system for a work machine which travels by transmitting the power of an engine to wheels through a torque converter and a transmission, the gear shifting control system comprising:
   automatic gear shifting control means having an automatic gear shifting mode in which the gear ratio in the transmission is changed based on a preset threshold value of gear shifting control thereby to perform gear shifting of the transmission; and
   learning correction means for learning desired gear shifting conditions in response to an operator intervention while the work machine travels, and correcting the gear shifting control threshold value so as to obtain the desired gear shifting conditions,
   wherein said learning correction means includes:
   first operating means operated by an operator;
   first display means for displaying a permissible gear shifting condition setting range;
   second display means for displaying a guidance which indicates whether a current traveling condition falls within the permissible gear shifting condition setting range displayed in said first display means so that a gear shifting condition setting is possible under the current traveling condition;
   gear shifting condition acquisition permission means for permitting gear shifting conditions to be acquired only when the gear shifting conditions prevailing when the first operating means is operated fall within said permissible gear shifting condition setting range displayed in said first display means;
   gear shifting condition acquisition means for acquiring the gear shifting conditions when said gear shifting condition acquisition permission means permits the acquisition thereof and storing a value for acquiring the gear shifting conditions; and
   third display means for displaying a guidance which indicates that the setting of gear shifting conditions is completed when said gear shifting condition acquisition means completes storing of the value for acquiring the gear shifting conditions; and
   wherein said automatic gear shifting control means includes first threshold value setup means for setting said gear shifting control threshold value by using the value stored in the gear shifting condition acquisition means.

2. The gear shifting control system according to claim 1, further comprising: second operating means, which is operated by the operator and used to choose between a normal mode and a learning mode,
   wherein said learning correction means further includes means for causing the gear shifting condition acquisition means to function when the learning mode is selected; and
   wherein said automatic gear shifting control means includes second threshold value setup means for setting a gear shifting control threshold value for the learning mode, and threshold value switching means for causing the first threshold value setup means to set a gear shifting control threshold value when the normal mode is selected and causing the second threshold value setup means to set a gear shifting control threshold value when the learning mode is selected.

3. The gear shifting control system according to claim 1,
   wherein the gear shifting condition acquisition means stores the acquired value for acquiring the gear shifting conditions as an adjustment value for the gear shifting control threshold value; and
   wherein the first threshold value setup means sets the gear shifting control threshold value by using the adjustment value for the threshold value and a preset initial value for the threshold value.

4. The gear shifting control system according to claim 3,
   wherein the gear shifting condition acquisition means calculates the difference between an acquired gear shifting condition and the initial value for the gear shifting control threshold value, and stores the difference as the adjustment value; and
   wherein the first threshold value setup means adds the difference to the initial value for the gear shifting control threshold value, and sets the resulting value as the gear shifting control threshold value.

5. The gear shifting control system according to claim 1, further comprising:
   learning/correction reset means for allowing the operator to reset the gear shifting control threshold value to the initial value.

6. The gear shifting control system according to claim 1,
   wherein said learning correction means acquires as a gear shifting condition to be learned a vehicle velocity prevailing when the operator performs an operation with intended timing.

7. The gear shifting control system according to claim 1,
   wherein the gear shifting condition acquisition means acquires as gear shifting conditions to be learned a vehicle velocity and a velocity ratio which prevail when the operator performs an operation with intended timing.

* * * * *